(12) United States Patent
Yeh et al.

(10) Patent No.: US 9,535,274 B2
(45) Date of Patent: Jan. 3, 2017

(54) LIQUID CRYSTAL DISPLAY PANEL

(71) Applicant: Au Optronics Corporation, Hsinchu (TW)

(72) Inventors: Chao-Wei Yeh, Taoyuan (TW); Chien-Huang Liao, Hsinchu (TW); Wen-Hao Hsu, Hsinchu County (TW)

(73) Assignee: Au Optronics Corporation, Hsinchu (TW)

( * ) Notice: Subject to any disclaimer, the term of this patent is extended or adjusted under 35 U.S.C. 154(b) by 52 days.

(21) Appl. No.: 14/697,649

(22) Filed: Apr. 28, 2015

(65) Prior Publication Data
US 2015/0241719 A1 Aug. 27, 2015

Related U.S. Application Data

(62) Division of application No. 13/207,416, filed on Aug. 11, 2011, now Pat. No. 9,104,074.

(30) Foreign Application Priority Data

May 5, 2011 (TW) .............................. 100115775 A

(51) Int. Cl.
*G09G 3/36* (2006.01)
*G02F 1/13* (2006.01)
*G02F 1/1333* (2006.01)
*G02F 1/1337* (2006.01)
*G02F 1/1343* (2006.01)

(52) U.S. Cl.
CPC ........... *G02F 1/1323* (2013.01); *G02F 1/1337* (2013.01); *G02F 1/133371* (2013.01); *G02F 1/133707* (2013.01); *G02F 1/134309* (2013.01); *G09G 3/36* (2013.01); *G09G 3/3607* (2013.01); *G09G 3/3666* (2013.01); *G09G 2300/0439* (2013.01);
(Continued)

(58) Field of Classification Search
CPC G02F 1/1323; G02F 1/133371; G02F 1/1337; G02F 1/133707; G02F 1/134309; G09G 3/36; G09G 3/3607; G09G 3/3666; G09G 2300/0439; G09G 2300/0478; G09G 2320/028; G09G 2358/00
USPC .......................................................... 345/89
See application file for complete search history.

(56) References Cited

U.S. PATENT DOCUMENTS

| | | | | |
|---|---|---|---|---|
| 2001/0017612 A1* | 8/2001 | Holtslag | .............. | G09G 3/2022 345/103 |
| 2010/0133533 A1* | 6/2010 | Umezaki | ............. | H01L 27/1255 257/43 |
| 2010/0141569 A1* | 6/2010 | Jang | ...................... | G02F 1/1323 345/95 |

FOREIGN PATENT DOCUMENTS

CN 101968585 2/2011

* cited by examiner

*Primary Examiner* — Mark Regn
(74) *Attorney, Agent, or Firm* — Jianq Chyun IP Office

(57) ABSTRACT

A liquid crystal display panel divided into a first and a second regions respectively having a plurality of sub-pixels arranged in array is provided. Each sub-pixel has a first display area providing a first main alignment vector, a second display area providing a second main alignment vector, and a compensation display area. A direction of the first main alignment vector is opposite to that of the second main alignment vector. When the liquid crystal display panel states in the narrow viewing angle display mode, driving voltages of the first display areas in the first region are substantially greater than driving voltages of the second display areas in the first region, driving voltages of the first
(Continued)

display areas in the second region are smaller than driving voltages of the second display areas in the second region, and all the compensation display areas in the first and the second regions are enabled.

14 Claims, 28 Drawing Sheets

(52) U.S. Cl.
 CPC  *G09G 2300/0478* (2013.01); *G09G 2320/028* (2013.01); *G09G 2358/00* (2013.01)

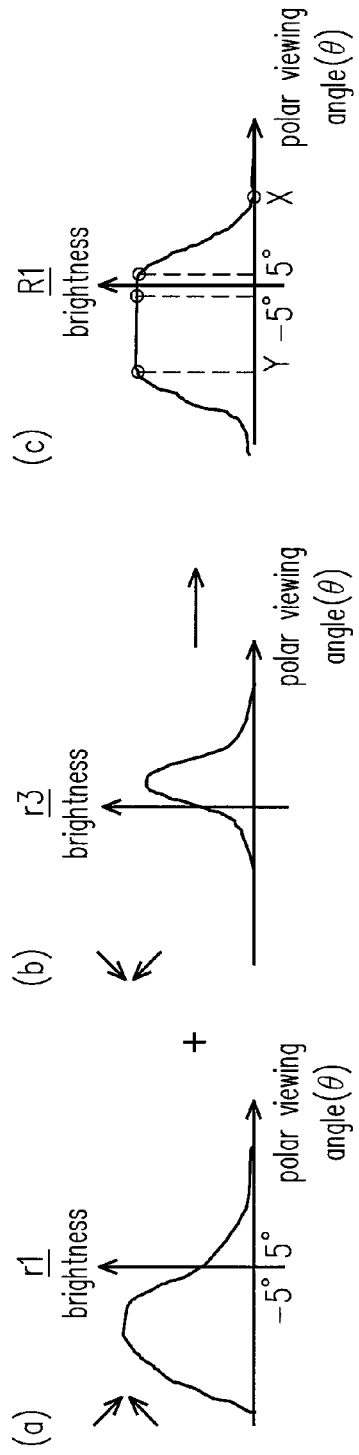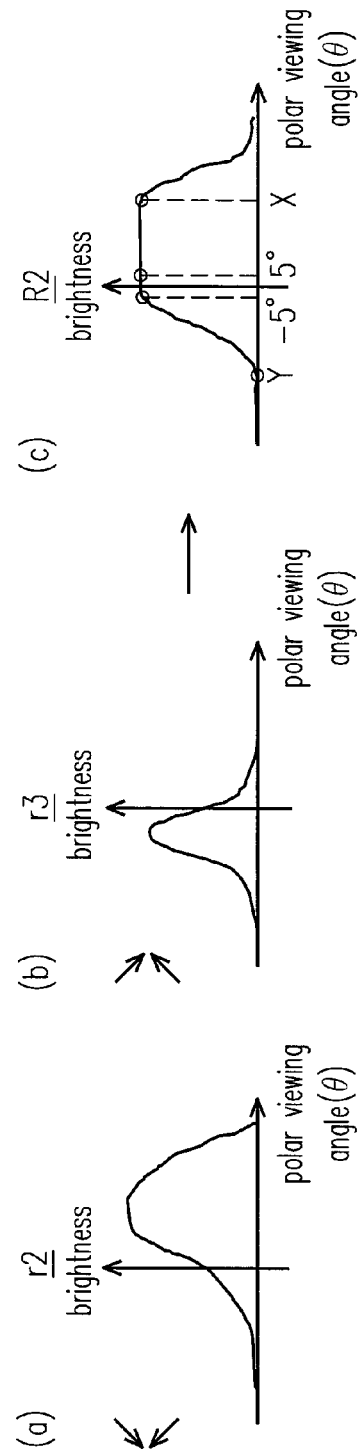
FIG. 18A
FIG. 18B

LIQUID CRYSTAL DISPLAY PANEL

CROSS-REFERENCE TO RELATED APPLICATION

This application is a divisional application of U.S. application Ser. No. 13/207,416, filed on Aug. 11, 2011, now allowed. The prior U.S. application Ser. No. 13/207,416 claims the priority benefit of Taiwan application serial no. 100115775, filed on May 5, 2011. The entirety of each of the above-mentioned patent applications is hereby incorporated by reference herein and made a part of this specification.

BACKGROUND OF THE INVENTION

Field of the Invention

The invention generally relates to a liquid crystal display (LCD) panel, and more particularly, to an LCD panel having the privacy protecting function.

Description of Related Art

Recently, the display device is required to have the wide-viewing characteristic when displaying images so as to satisfy the demand that a plurality of users simultaneously watches the displayed images of the same display device. Nevertheless, under certain conditions, such as writing business information or inputting personal account number and password into the ATM machine, the wide viewing characteristic of the display device may cause the reveal of user's personal information. Accordingly, the display device needs the privacy protecting designs for preventing the highly confidential data from being seen.

At present, a privacy protecting design is provided and achieved by using the alignment design of the LCD panel. In such privacy protecting technology, the LCD panel is used for providing the displaying function in the display device. Generally, the LCD panel is disposed between two polarizers, while the directions of the light transmission axis of the two polarizers respectively are configured parallel to the line direction and the row direction in the pixel array of the LCD panel. Namely, the light transmission axes of the two polarizers are restrictedly located in 0 degree azimuth angle and 90 degree azimuth angle and the light transmission axes of the two polarizers are included with each other by 90 degrees. Meanwhile, the LCD panel is divided into two regions such as the first region and the second region.

The changes of brightness with variant polar viewing angles and variant azimuth viewing angles have different tendencies in the first region and the second region of the LCD panel. Herein, the polar viewing angle means the included angle between the watching direction of the user and the baseline when the normal viewing angle direction (defining 0 degree polar viewing angle) is served as the baseline (i.e. the normal line of the LCD panel) and the azimuth viewing angle means the included angle in the horizontal surface between the watching direction of the user and a horizontal axis direction. By using such design, the LCD panel can have the privacy protecting function. The brightness distribution of the known LCD panel under different polar viewing angles is described in the following.

FIG. 1 shows the relationship between the displayed brightness presented by a conventional LCD panel under the privacy protecting mode and the corresponding polar viewing angles when the LCD panel is watched at variant polar viewing angles along the horizontal axis direction (that is, the direction parallel to the 0 degree azimuth viewing angle or the 180 degree azimuth viewing angle). Referring to FIG. 1, the curve 110 shows the relationship between the displayed brightness presented by the first region of the LCD panel and the polar viewing angles when the LCD panel under the privacy protecting mode is watched at variant polar viewing angles along the horizontal axis direction and the curve 120 shows the relationship between the displayed brightness presented by the second region of the LCD panel and the polar viewing angles when the LCD panel under the privacy protecting mode is watched at variant polar viewing angles along the horizontal axis direction, wherein the polar viewing angle at the normal viewing angle direction is, for instance, defined as 0 degree and the normal viewing angle direction means that the watching direction of the user is perpendicular to the outer surface of the substrate of the LCD panel. Herein, the normal viewing angle direction is defined as the position of the 0 degree polar viewing angle and the outer surface of the substrate of the LCD panel is defined as the position of the 90 degree polar viewing angle.

As shown in the curve 110 and the curve 120, the brightness presented in the first region is identical to the brightness presented in the second region when the watching direction is located at the normal viewing angle direction (that is the 0 degree polar viewing angle). Accordingly, the user can see the clear displayed image if the two eyes of the user both receive the display image in the normal viewing angle direction. Comparatively, at the polar viewing angle P1, the brightness presented in the first region as shown in the curve 110 is relatively weak while the brightness presented in the second region as shown in the curve 120 is relatively strong. Therefore, the user who watches the displayed image at the polar viewing angle P1 can merely see the unclear image information, thereby the privacy protecting effect can be achieved. It is noted that the user can see the complete image information merely when he or she watches the displayed image in the normal viewing angle direction and the user who watches the displayed image in the side viewing angle direction can only see the unclear image information. Therefore, the privacy protecting mode can be called as a narrow viewing angle display mode.

Specifically, as presented by the curve 110 and the curve 120, the first region and the second region present the same displayed brightness only when the polar viewing angle is 0 degree. Nevertheless, practically, the polar viewing angle that the user watches the image displayed by the display panel in the normal viewing angle direction may be located at the range from the angle P2 to the angle P3, such as the angle including the 0 degree normal viewing angle by ±5 degrees owing that the two eyes of the user are separated from each other by a distance. That is to say, the two eyes of the user located in the normal viewing angle direction see the image presented by the LCD panel at the angles adjacent to the normal viewing angle rather than right at the normal viewing angle in the real circumstance. In the meantime, the brightness received by the two eyes of the user differs from each other so that the user located in the normal viewing angle direction may feel giddy when watching the displayed image. In summary, the privacy protecting mode, i.e. the narrow viewing angle display mode, though prevents from the reveal of the personal information, causes uncomfortable feeling of the user in the normal viewing angle direction.

SUMMARY OF THE INVENTION

The invention provides an LCD panel having privacy protecting effect and favorable display quality.

The invention provides another LCD panel having privacy protecting effect and favorable display quality.

For describing the scope of the invention in detail, an LCD panel divided into at least one first region and at least one second region is provided. The first region and the second region respectively have a plurality of sub-pixels arranged in an array, and each of the sub-pixels has a first display area, a second display area and a compensation display area. The first display area provides a first main alignment vector. The second display area provides a second main alignment vector, and a direction of the first main alignment vector is opposite to a direction of the second main alignment vector. A cell gap of the compensation display area is substantially greater than a cell gap of the first display area and also substantially greater than a cell gap of the second display area. Driving voltages of the first display areas in the first region are substantially greater than driving voltages of the second display areas in the first region, driving voltages of the first display areas in the second region are substantially smaller than driving voltages of the second display areas in the second region, and all the compensation display areas in the first region and the second region are enabled when the LCD panel states in a narrow viewing angle display mode.

Another LCD panel is provided in the invention and the LCD panel includes at least one first region and at least one second region, wherein the first region and the second region respectively have a plurality of sub-pixels. Each of the sub-pixels includes a first display area and a second display area. The first display area is divided into a plurality of first alignment areas by a first horizontal baseline and a first vertical baseline, the first alignment areas respectively have a liquid crystal alignment, and the liquid crystal alignments of the first alignment areas are different from one another. The second display area is divided into a plurality of second alignment areas by a second horizontal baseline and a second vertical baseline, the second alignment areas respectively have a liquid crystal alignment, and the liquid crystal alignments of the second alignment areas are different from one another. A first driving voltage of the first display areas in the first region is substantially greater than a second driving voltage of the first display areas in the second region, and the second driving voltage is substantially greater than 0 when the LCD panel displays a first normal viewing brightness under a narrow viewing angle mode.

In view of the above, the LCD panel according to the invention improves the problem of giddy feeling of the user when the user watches the image displayed by the LCD panel under the narrow viewing angle display mode in the normal viewing angle direction by configuring the compensation display area or modulating the brightness of the display areas and the LCD panel according to the invention also provides desirable privacy protecting effect.

In order to make the aforementioned and other features and advantages of the invention more comprehensible, embodiments accompanying figures are described in detail below.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

FIG. 9A and FIG. 18A shows the brightness distribution presented by the enabled different display areas of each sub-pixel in the first region when the LCD panel states in the narrow viewing angle display mode according to embodiments of the invention.

FIG. 9B and FIG. 18B show the brightness distribution presented by the enabled different display areas of each sub-pixel in the second region when the LCD panel states in the narrow viewing angle display mode according to embodiments of the invention.

DESCRIPTION OF EMBODIMENTS

Figure 1:
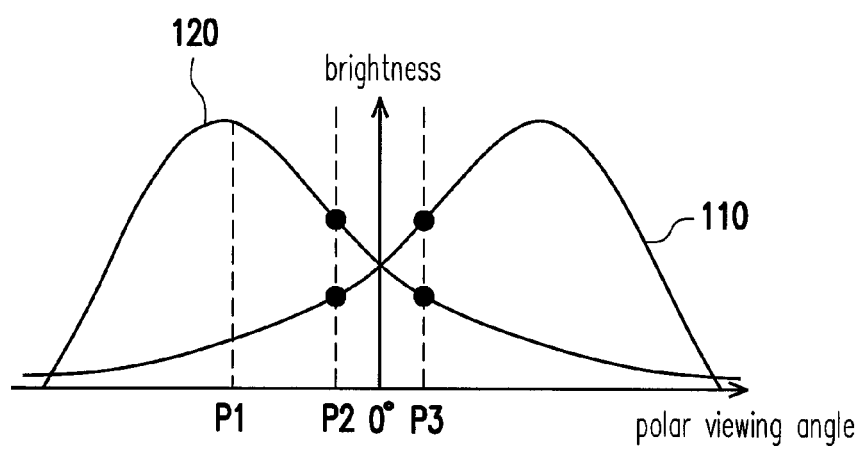
FIG. 1 shows the relationship between the displayed brightness presented by a conventional LCD panel and the corresponding polar viewing angles when the LCD panel is watched at variant polar viewing angles along the horizontal axis direction.

In the LCD panel of the invention, each of the sub-pixels has a first display area and a second display area, and further selectively has a compensation display area. Namely, each of the sub-pixels is divided into a plurality of display areas. Furthermore, a main alignment vector of the first display area has a direction opposite to a direction of a main alignment vector of the second display area, wherein the represented "main alignment vector" in the disclosure means the quantification of the alignment force subjected by the liquid crystal layer in each display area of the LCD panel. Generally, the value and the direction of the alignment force subjected by the liquid crystal layer in each display area determines the presented brightness distribution of the display area under variant polar viewing angles and variant azimuth viewing angles. Accordingly, the opposite directions of the main alignment vectors provided respectively by the first display area and the second display area represent that the brightness distributions presented by the first display area and the second display area are not identical to each other under variant polar viewing angles and variant azimuth viewing angles. For example, the brightness distributions present by the first display area and the second display area can be shown as the curve 110 and the curve 120 in FIG. 1, respectively.

The first display area and the second display area of each sub-pixel are enabled (i.e. are lighted) when the LCD panel states in the wide viewing angle display mode, and thus the brightness at different viewing angles presented by the first display area and the second display area in each sub-pixel can compensate mutually to facilitate the wide viewing angle characteristic of each sub-pixel and achieve the wide viewing angle display effect of the LCD panel in the invention.

The LCD panel is divided into at least one first region and at least one second region when the LCD panel according to the invention states in the narrow viewing angle display mode. In the meantime, driving voltages of the first display areas in the first region are substantially greater than driving voltages of the second display areas in the first region, and driving voltages of the first display areas in the second region are substantially smaller than driving voltages of the second display areas in the second region. In an example, the first display area of the sub-pixel in the first region can be enabled while the second display area of the sub-pixel in the first region is disabled, and with respect to the sub-pixel in the second region, the second display area is enabled while the first display area is disabled. Accordingly, the brightness distributions under variant polar viewing angles and variant azimuth angles are different in the first region and the second region of the LCD panel. Based on such circumstance, the brightness presented by the first region or the second region is different from the predetermined displayed brightness when the LCD panel is watched at the side viewing angles so that the user located in the side viewing angle direction can not see the correct image, which facilitates the privacy protecting effect.

Particularly, under the configuration of the compensation display areas, the compensation display areas of all the sub-pixels are enabled when the LCD states in the narrow viewing angle display mode so as to compensate the brightness at the angles adjacent the normal viewing angle presented by each sub-pixel in the first region and the second region. Alternately, the display area in each sub-pixel which is predetermined to be disabled can display a darker (faint) brightness when the LCD panel is configured without the compensation display area. Herein, the brightness at the viewing angle adjacent the normal viewing angle presented by the first region and the second region in the LCD panel can be substantially identical to the predetermined displayed brightness so that the problem that the user located in the normal viewing angle direction feels giddy when watching the image displayed by the LCD panel under the narrow viewing angle display mode is mitigated.

It is noted that the cell gap of the compensation display area is substantially greater than the cell gap of the first display area and also substantially greater than the cell gap of the second display area in the LCD panel according to the invention, such that the brightness distribution provided by the compensation display area is more concentrated around the normal viewing angle (i.e. concentrated at the small side viewing angles) than that provided by the first display area and the second display area. As such, the brightness at the viewing angle adjacent the normal viewing angle can be compensated by the enabled compensation display area so that the problem that the user located in the normal viewing angle direction feels giddy when watching the image displayed by the LCD panel under the narrow viewing angle display mode is mitigated. On the other hand, the brightness distribution presented by the compensation display area is concentrated around the normal viewing angle so that the brightness provided by the compensation display area would not negatively influence on the privacy protecting effect of the LCD panel.

In light of the foregoing, the LCD panel according to the invention improves the problem of giddy feeling of the user when the user watches the image displayed by the LCD panel under the narrow viewing angle display mode in the normal viewing angle direction by configuring the compensation display area or modulating the brightness of the display areas and the LCD panel according to the invention also provides desirable privacy protecting effect.

The features of the invention are further described in the following accompanying with the drawings.

The First Embodiment

Figure 2:
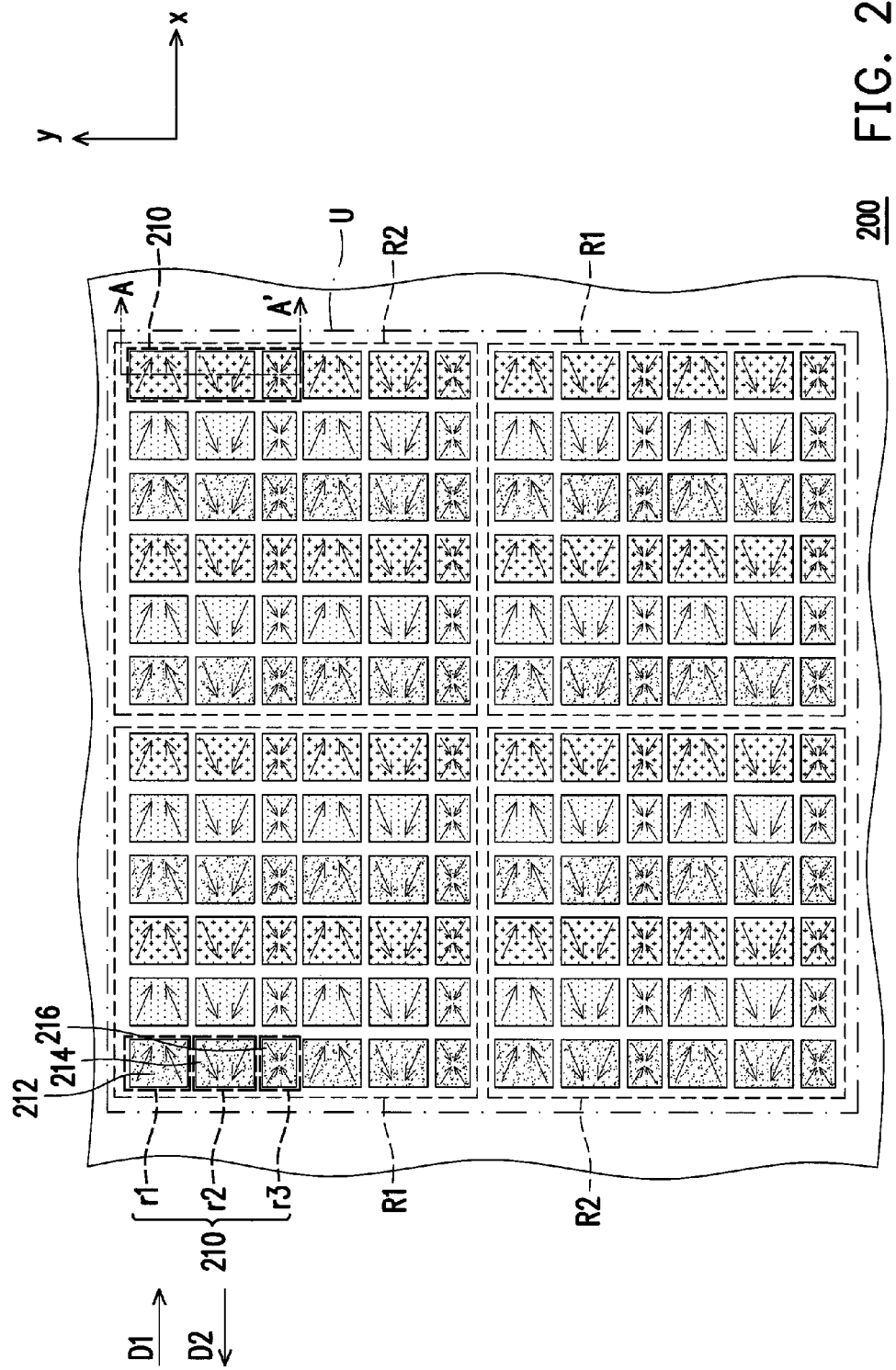
FIG. 2, FIG. 13, FIG. 19, and FIG. 21 are schematic diagrams of LCD panels according to embodiments of the invention.

FIG. 2 is a schematic view of an LCD panel according to an embodiment of the invention. Referring to FIG. 2, an LCD panel 200 in this embodiment is divided into at least one first region R1 and at least one second region R2. For instance, the LCD panel 200 according to the present embodiment can be divided into a plurality of region unit U arranged in an array. Each region unit U includes two first regions R1 and two second regions R2, wherein the first regions R1 and the second regions R2 are alternatively arranged in the x direction and in the y direction.

Each of the first regions R1 and each of the second regions R2 respectively have a plurality of sub-pixels 210 arranged in an array. The color displayed by the sub-pixels 210 can include red, green, blue, yellow, and the like, but the invention is not limited thereto. Each of the sub-pixels 210 has a first display area r1, a second display area r2, and a compensation display area r3. The first display area r1 provides the first main alignment vector D1 and the second display area r2 provides a second main alignment vector D2, wherein a direction of the first main alignment vector D1 is opposite to a direction of the second main alignment vector D2.

Specifically, the first display area r1, the second display r2, and the compensation display area r3 according to the present embodiment can be defined by the first pixel electrode 212, the second pixel electrode 214, and the third pixel electrode 216 of each sub-pixel 210.

Figure 3A:
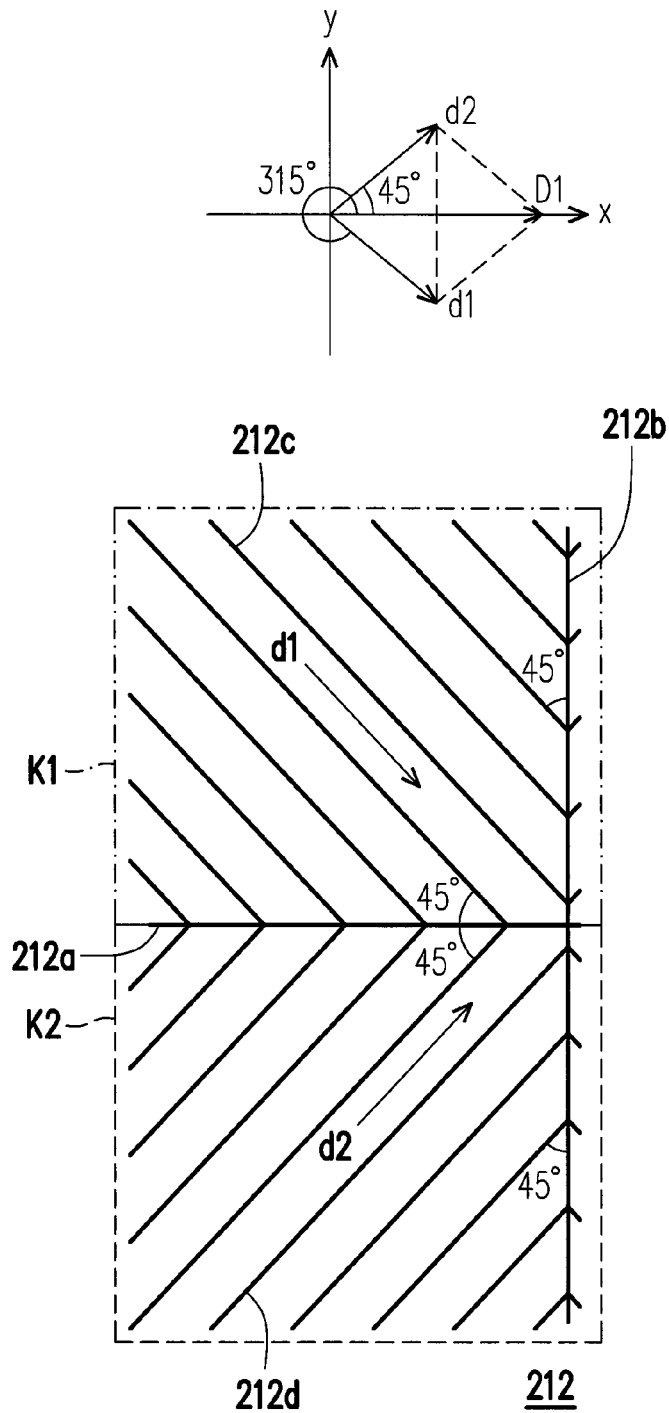
FIG. 3A and FIG. 3B are schematic diagrams of the first pixel electrodes according to embodiments of the invention.

FIG. 3A is a schematic diagram of the first pixel electrode according to an embodiment of the invention. Referring to FIG. 3A, the first pixel electrode 212 in the present embodiment can have a first alignment area K1 and a second alignment area K2 and the vector sum of a first alignment vector d1 of the first alignment area K1 and a second alignment vector d2 of the second alignment area K2 constructs the first main alignment vector D1. It is noted that the alignment vector described in the disclosure means the vector transformed from the alignment ability provided by one single alignment area, wherein the direction and the value of each alignment vector are related to the structural design of the alignment area and the area thereof.

Referring to FIG. 3A, the first pixel electrode 212 in the present embodiment can specifically include two first main trunk portions 212a and 212b and a plurality of first branch portions 212c and 212d connected with the first main trunk portion 212a or the first main trunk portion 212b, wherein the extending direction of the first main trunk portion 212a is substantially parallel to the x direction and the extending direction of the first main trunk portion 212b is substantially parallel to the y direction. The first main trunk portion 212a is substantially parallel to the x direction divides the first pixel electrode 212 into the first alignment area K1 and the second alignment area K2. The first branch portions 212c are disposed in the first alignment area K1 and are intersected with the first main trunk portion 212a or the first main trunk 212b by about 45 degrees. The first branch portions 212d are disposed in the second alignment area K2 and are intersected with the first main trunk portion 212a or the second main trunk 212b by about 45 degrees. In addition, the first branch portions 212c and the first branch portions 212d are not parallel to each other. According to the x direction depicted in FIG. 3A, the direction of the first alignment vector d1 provided by the first branch portions 212c in the first alignment area K1 is intersected with the x direction by about 315°. The direction of the second alignment vector d2 provided by the first branch portions 212d in the second alignment area K2 is intersected with the x direction by about 45°. As a whole, the direction of the vector sum (i.e. the first main alignment vector D1) of the first alignment vector d1 and the second alignment vector d2 directs toward the +x direction.

Figure 3B:
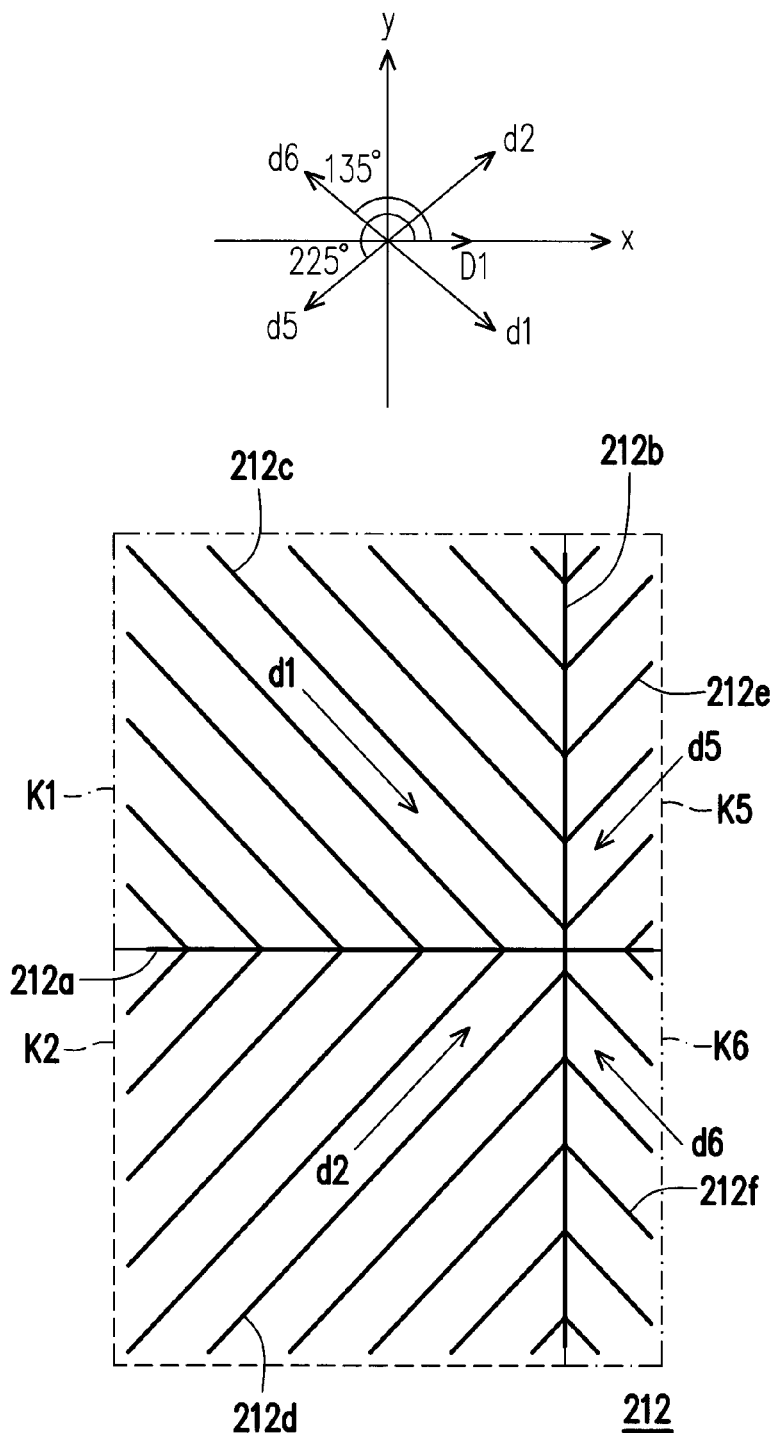

However, the invention is not limited thereto. The first pixel electrode 212 can be designed as that shown in FIG. 3B, wherein a fifth alignment area K5 and a sixth alignment area K6 can be further demarked in the first pixel electrode 212 by the first main trunk portions 212a and 212b in addition to the first alignment area K1 and the second alignment area k2. Herein, the first alignment vector d1 of the first alignment area K1, the second alignment vector d2 of the second alignment area K2, a fifth alignment vector d5 of the fifth alignment area K5, and a sixth alignment vector d6 of the sixth alignment area K6 together construct the first main alignment vector D1.

In addition, the first pixel electrode 212 in the present embodiment can further include a plurality of first branch portions 212e and 212f connected with the first main trunk portion 212a or the first main trunk portion 212b, wherein the first branch portions 212e are located in the fifth alignment area K5 and the first branch portions 212f are located in the sixth alignment area K6. The direction of the fifth alignment vector d5 provided by the first branch portions 212e in the fifth alignment area K5 is intersected with the x direction by about 225°. The direction of the sixth alignment vector d6 provided by the first branch portions 212f in the sixth alignment area K6 is intersected with the x direction by about 135°. As a whole, the direction of the vector sum (i.e. the first main alignment vector D1) of the first alignment vector d1, the second alignment vector d2, the fifth alignment vector d5, and the sixth alignment vector d6 directs toward the +x direction.

Figure 4A:
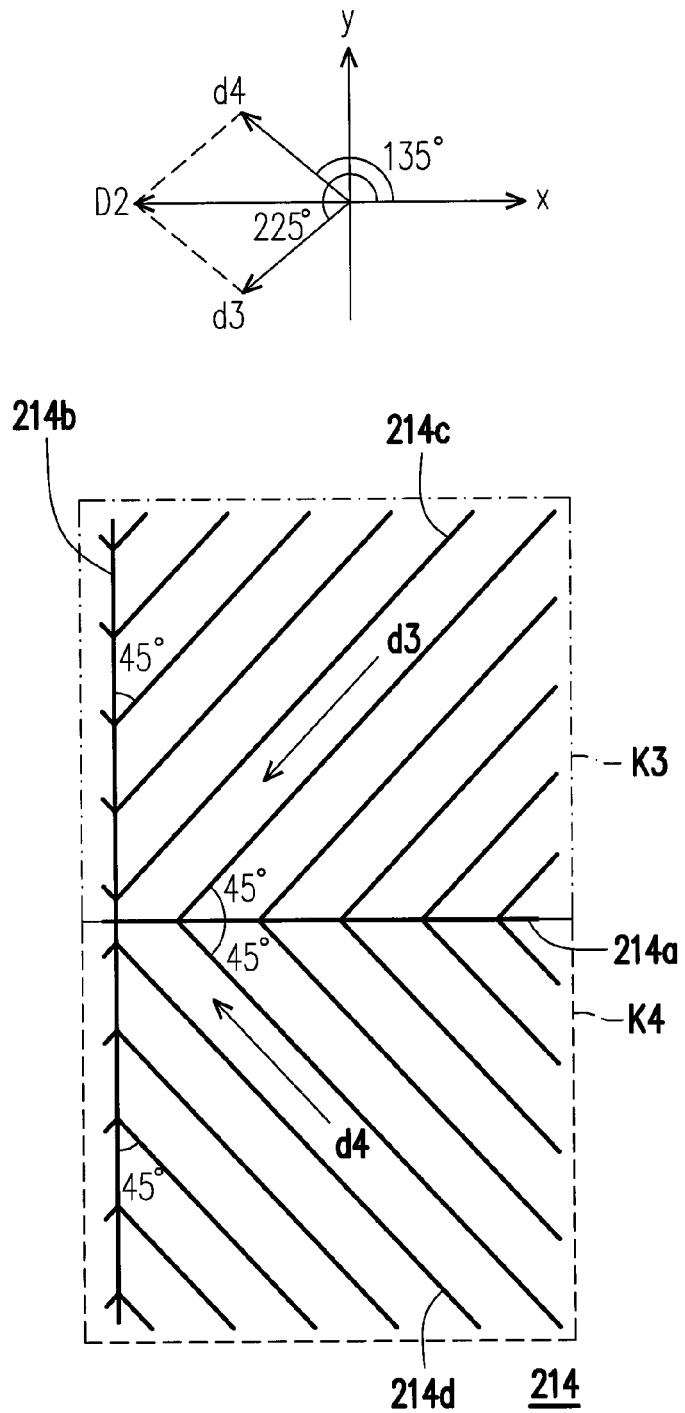
FIG. 4A and FIG. 4B are schematic diagrams of the second pixel electrodes according to embodiments of the invention.

FIG. 4A is a schematic diagram of the second pixel electrode according to an embodiment of the invention. Referring to FIG. 4A, the second pixel electrode 214 in the present embodiment can have a third alignment area K3 and a fourth alignment area K4 and a vector sum of a third alignment vector d3 of the third alignment area K3 and a fourth alignment vector d4 of the fourth alignment area K4 constructs the second main alignment vector D2.

Referring to FIG. 4A, the second pixel electrode 214 in the present embodiment can specifically include two second main trunk portions 214a and 214b and a plurality of second branch portions 214c and 214d connected with the second main trunk portion 214a or the second main trunk portion 214b, wherein the extending direction of the second main trunk portion 214a is substantially parallel to the x direction and the extending direction of the second main trunk portion 214b is substantially parallel to the y direction. The second main trunk portion 214a is substantially parallel to the x direction divides the second pixel electrode 214 into the third alignment area K3 and the fourth alignment area K4. The second branch portions 214c are disposed in the third alignment area K3 and are intersected with the second main trunk portion 214a or the second main trunk 214b by about 45 degrees. The second branch portions 214d are disposed in the fourth alignment area K4 and are intersected with the second main trunk portion 214a or the second main trunk 214b by about 45 degrees. In addition, the second branch portions 214c and the second branch portions 214d are not parallel to each other.

According to the x direction depicted in FIG. 4A, the direction of the third alignment vector d3 provided by the second branch portion 214c in the third alignment area K3 is intersected with the x direction by about 225°. The direction of the fourth alignment vector d4 provided by the second branch portion 214d in the fourth alignment area K4 is intersected with the x direction by about 135°. As a whole, the direction of the vector sum (i.e. the second main alignment vector D2) of the third alignment vector d3 and the fourth alignment vector d4 directs toward the −x direction.

Figure 4B:
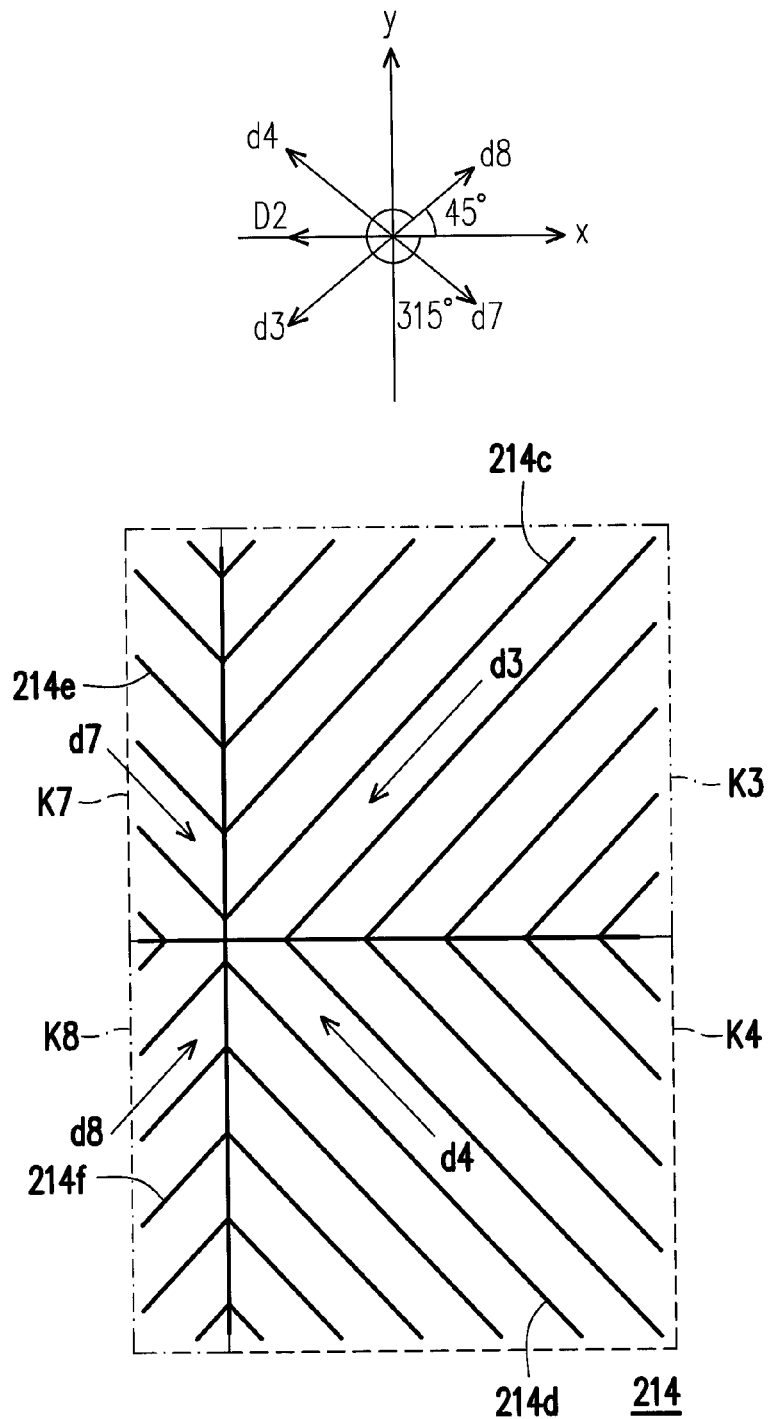

However, the invention is not limited thereto. The second pixel electrode 214 can be designed as that shown in FIG. 4B, wherein a seventh alignment area K7 and an eighth alignment area K8 can be further demarked in the second pixel electrode 214 by the second main trunk portions 214a and 214b in addition to the third alignment area K3 and the fourth alignment area k4. Herein, the third alignment vector d3 of the third alignment area K3, the fourth alignment vector d4 of the fourth alignment area K4, a seventh alignment vector d7 of the seventh alignment area K7, and an eighth alignment vector d8 of the eighth alignment area K8 together construct the second main alignment vector D2.

In addition, the second pixel electrode 214 in the present embodiment can further include a plurality of second branch portions 214e and 214f connected with the second main trunk portion 214a or the second main trunk portion 214b, wherein the second branch portions 214e are located in the seventh alignment area K7 and the second branch portions 214f are located in the eighth alignment area K8. The direction of the seventh alignment vector d7 provided by the second branch portion 214e in the seventh alignment area K7 is intersected with the x direction by about 315°. The direction of the eighth alignment vector d8 provided by the second branch portion 214f in the eighth alignment area K8 is intersected with the x direction by about 45°. As a whole, the direction of the vector sum (i.e. the second main alignment vector D2) of the third alignment vector d3, the fourth alignment vector d4, the seventh vector d7, and the eighth vector d8 directs toward the −x direction.

It is noted that the amount of the alignment areas configured in the pixel electrodes 212 and 214 is not particularly limited and merely the total alignment ability provided by the electrode constructs the main alignment vector D1 or D2 can the electrode be used as the pixel electrode in the sub-pixel 210 depicted in FIG. 2. In addition, the achievement of the alignment ability of the first main alignment vector D1 is not limited by using the design of the pixel electrode 212 in the invention. In other embodiments, the alignment structures or other structure design can be used in the sub-pixel 210 for having the required alignment ability.

Figure 5:
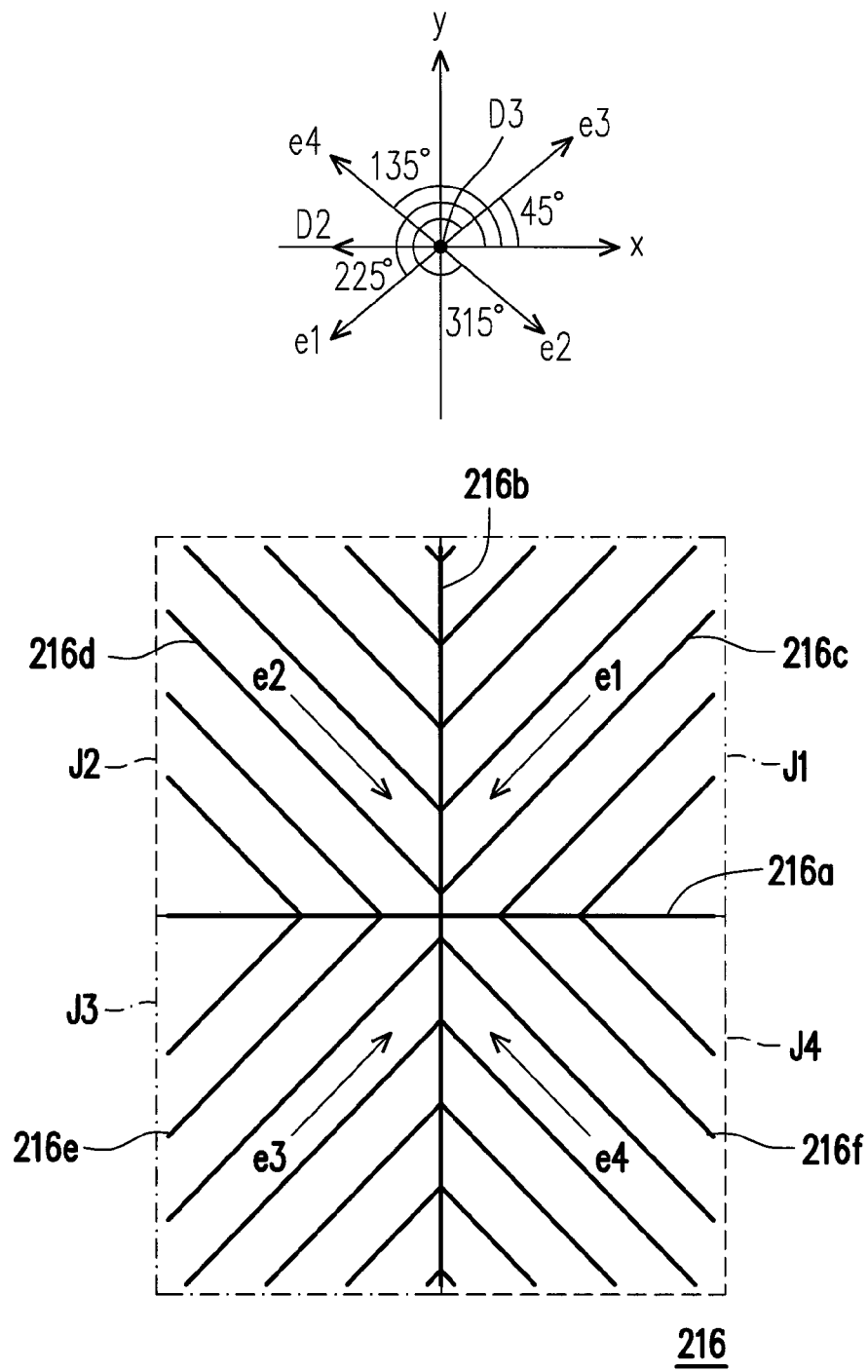
FIG. 5, FIG. 14A, FIG. 14B, FIG. 15A, and FIG. 15B are schematic diagrams of the third pixel electrodes according to embodiments of the invention.

FIG. 5 is a schematic diagram of the third pixel electrode according to an embodiment of the invention. Referring to FIG. 5, the third pixel electrode 216 can have a first compensation alignment area J1, a second compensation alignment area J2, a third compensation alignment area J3, and a fourth compensation alignment area J4, and a vector sum of a first compensation alignment vector e1 of the first compensation alignment area J1, a second compensation alignment vector e2 of the second compensation alignment area J2, a third compensation alignment vector e3 of the third compensation alignment area J3, and a fourth compensation alignment vector e4 of the fourth compensation alignment area J4 constructs the main compensation vector D3.

Referring to FIG. 5, the third pixel electrode 216 in the present embodiment can specifically include two third main trunk portions 216a and 216b and a plurality of third branch portions 216c, 216d, 216e, and 216f connected with the third main trunk portion 216a or the third main trunk portion 216b, wherein the extending direction of the third main trunk portion 216a is substantially parallel to the x direction and the extending direction of the third main trunk portion 216b is substantially parallel to the y direction. The third main trunk portions 216a and 216b divide the third pixel electrode 216 into the first compensation alignment area J1, the second compensation alignment area J2, the third compensation alignment area J4 having substantial the same area. The third branch portions 216c are located in the first compensation alignment area J1 and the direction of the first compensation alignment vector e1 provided in the first compensation alignment area J1 is intersected with the x direction by about 225°. The third branch portions 216d are located in the second compensation alignment area J2 and the direction of the second compensation alignment vector e2 provided in the second compensation alignment area J2 is intersected with the x direction by about 315°. The third branch portions 216e are located in the third compensation alignment area J3 and the direction of the third compensation alignment vector e3 provided in the third compensation alignment area J3 is intersected with the x direction by about 45°. The third branch portions 216f are located in the fourth compensation alignment area J4 and the direction of the fourth compensation alignment vector e4 provided in the fourth compensation alignment area J4 is intersected with the x direction by about 135°. In the present embodiment, the vector sum (i.e. the main compensation alignment D3) of the first compensation alignment vector e1, the second compensation alignment vector e2, the third compensation alignment vector e3, and the fourth compensation alignment vector e4 can be substantially zero. However, the present invention does not limited to the embodiment. According to another embodiment, the main compensation alignment vector D3 can be other vector. It is noted that the alignment vectors can be achieved by various methods according to the invention and each pixel electrode is not limited to the aforesaid embodiments. That is, the design of the pixel electrodes can be modified according to the actual requirement and the invention is not restricted thereto.

Figure 6A:
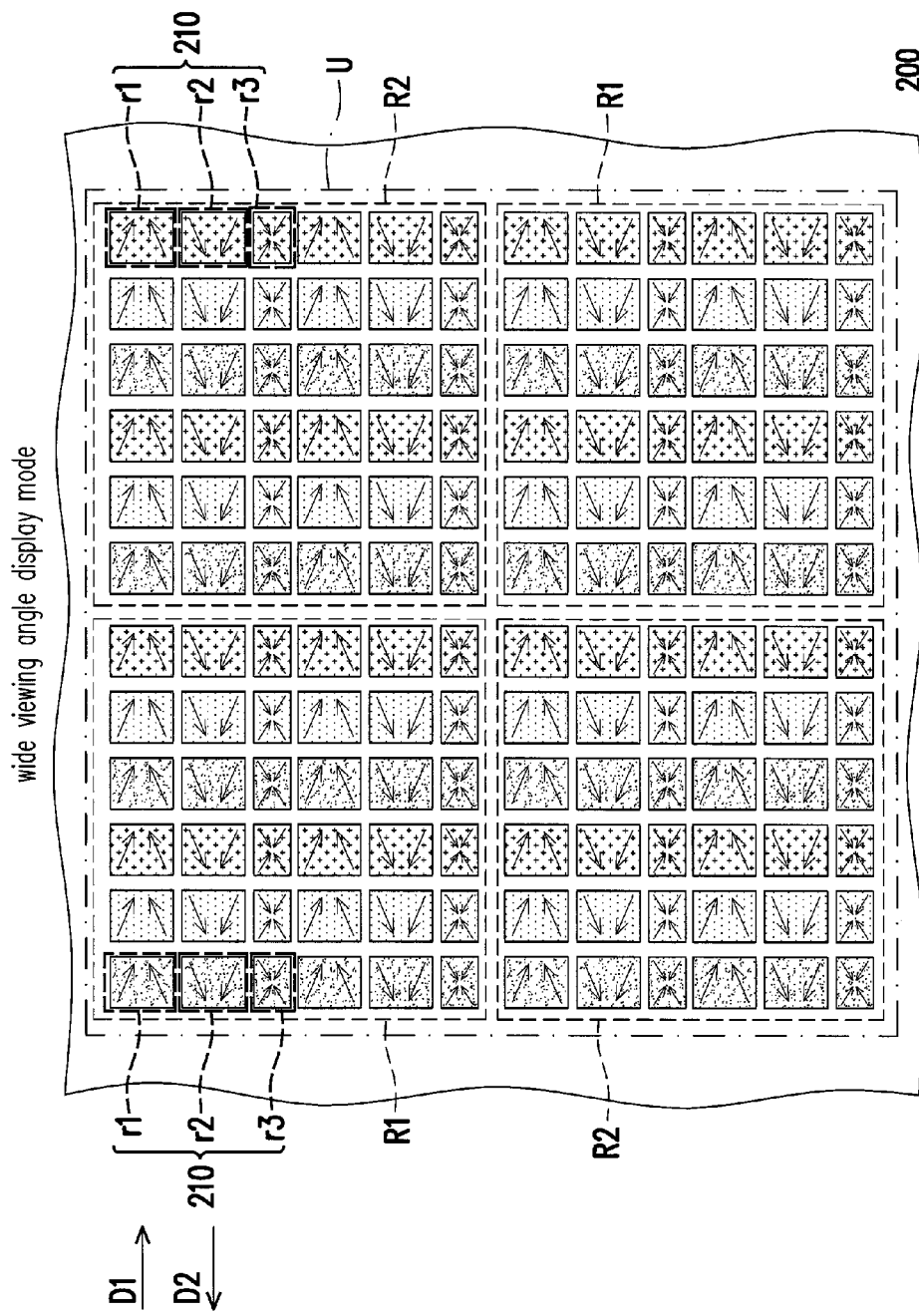
FIG. 6A, FIG. 6B, FIG. 16, and FIG. 22A are schematic diagrams of LCD panels under the wide viewing angle display mode according to embodiments of the invention.
Figure 6B:
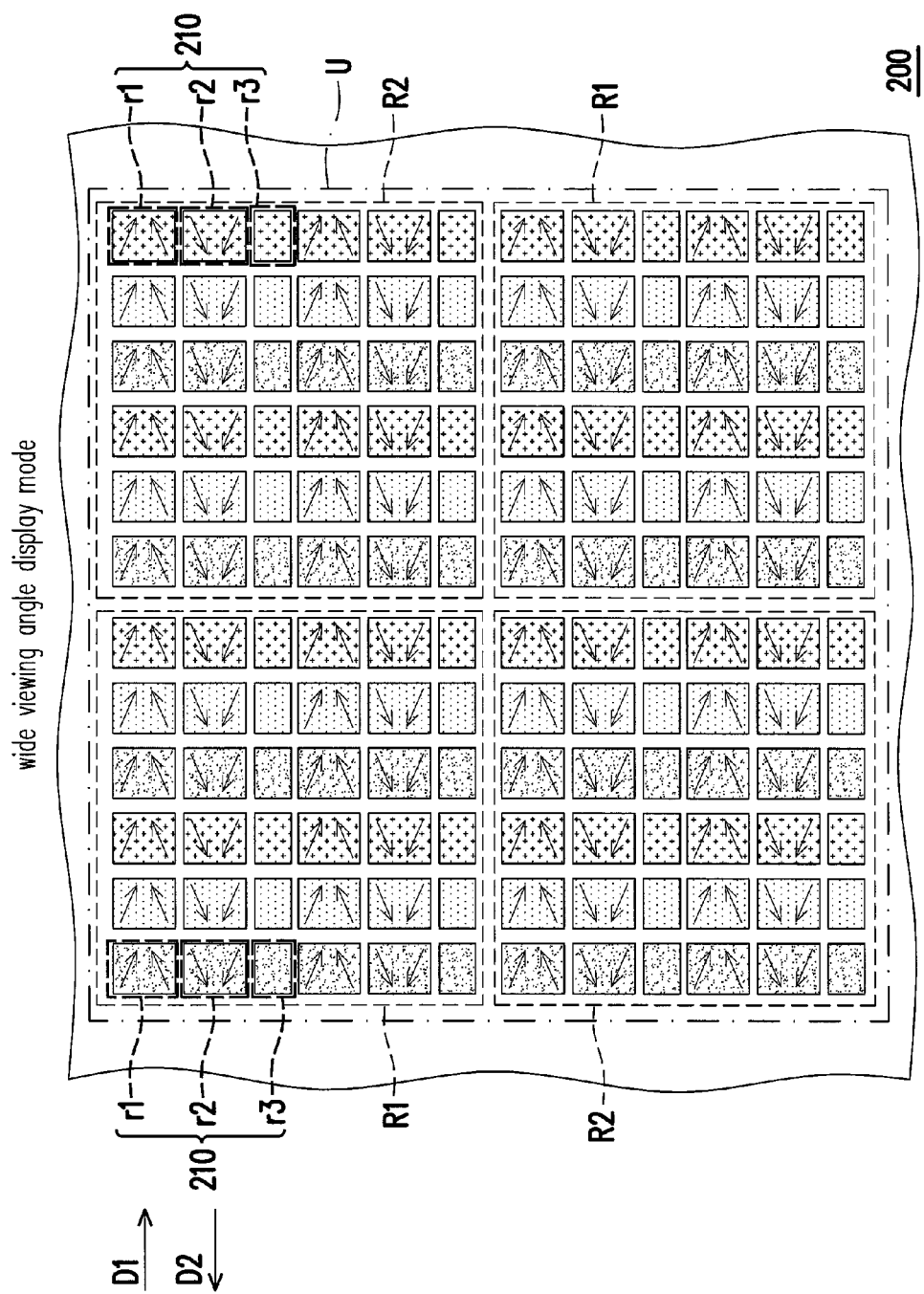

FIG. 6A is a schematic view of an LCD panel under the wide viewing angle display mode according to the first embodiment of the invention. Referring to FIG. 6, each of the sub-pixels 210 has a first display area r1, a second display area r2, and a compensation display area r3 which are driven independently. All the first display areas r1 and all the second display areas r2 of the sub-pixels 210 in the first region R1 and the second region R2 are enabled when the LCD panel 200 states in the wide viewing angle display mode. Furthermore, the compensation display areas r3 of all the sub-pixels 210 located in the first region R1 and the second region R2 are enabled. Herein, the first display area r1, the second display area r2, and the compensation display area r3 in each sub-pixel 210 provide the displayed brightness and the brightness displayed by each sub-pixel 210 at variant viewing angles complies with the predetermined displayed brightness because the first main alignment vector D1 of the first display area r1 differs from the second main alignment vector D2 of the second display area r2, such that the LCD panel 200 has the wide viewing angle display characteristic. However, the invention is not limited thereto. As shown in FIG. 6B, the compensation display areas r3 of all the sub-pixels 210 in the first region R1 and the second region R2 can be disabled when the LCD panel 200 states in the wide viewing angle display mode. Herein, the LCD panel 200 still has the wide viewing angle display characteristic while the brightness presented by the LCD panel 200 at variant viewing angles is slightly reduced.

Figure 7:
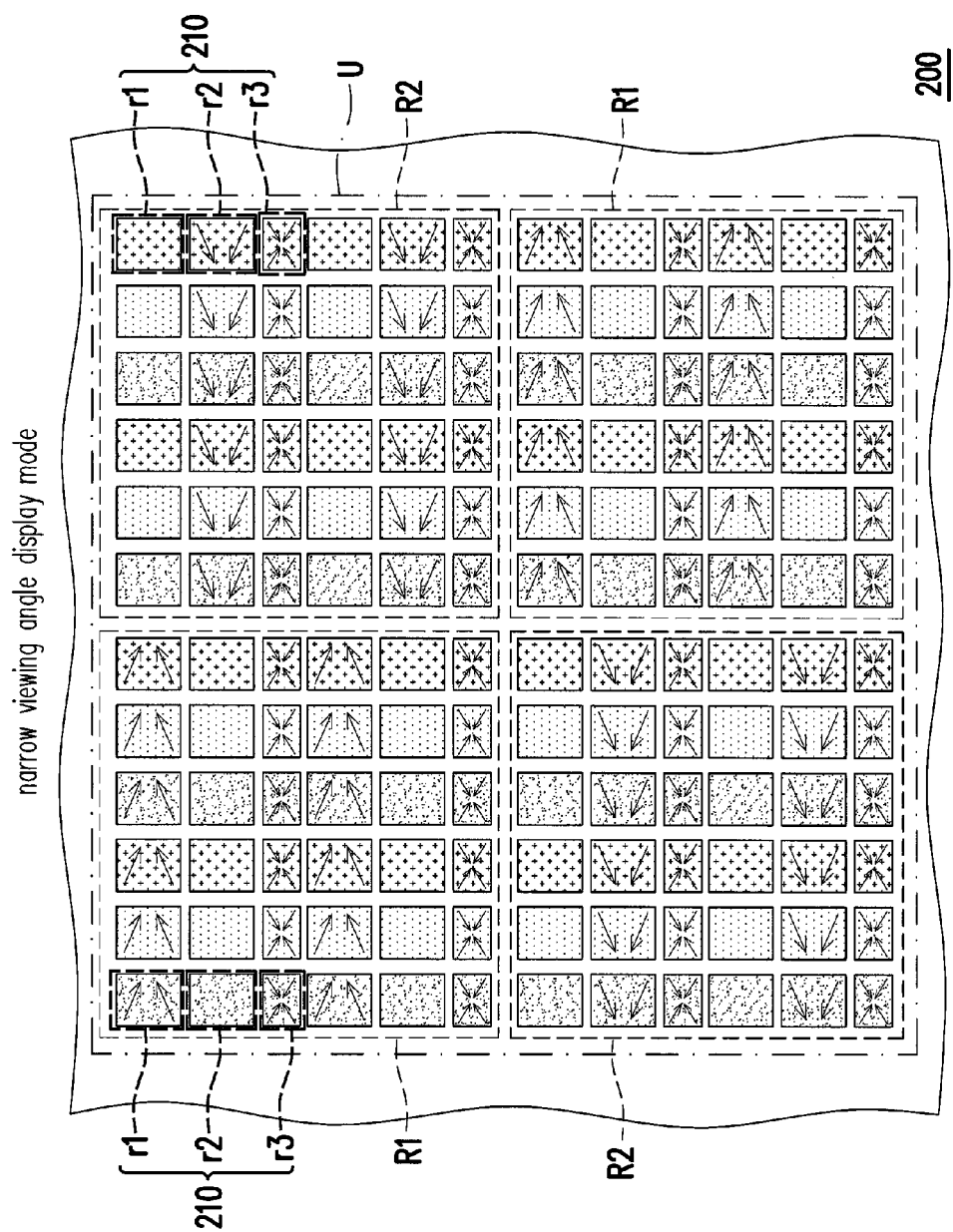
FIG. 7, FIG. 17, and FIG. 22B are schematic diagrams of LCD panels under the narrow viewing angle display mode according to embodiments of the invention.

FIG. 7 is a schematic view of an LCD panel under the narrow viewing angle display mode according to the first embodiment of the invention. Referring to FIG. 7, the first region R1 and the second region R2 are operated by different methods when the LCD panel 200 states in the narrow viewing angle display mode. Specifically, driving voltages of the first display areas r1 in the first region R1 are substantially greater than driving voltages of the second display areas r2 in the first region R1 and driving voltages of the first display areas r1 in the second region R2 are substantially smaller than driving voltages of the second display areas r2 in the second region R2 when the LCD panel 200 states in the narrow viewing angle display mode. For instance, in the first region R1, the first display area r1 of each sub-pixel 210 is enabled and the second display area r2 of each sub-pixel 210 is disabled. In addition, in the second region R2, the first display area r1 of each sub-pixel 210 is disabled and the second display area r2 of each sub-pixel 210 is enabled. The first main alignment vector D1 of the first display area r1 has the direction opposite to the direction of the second main alignment vector D2 of the second display area r2, such that the brightness distributions in the first region R1 and the second region R2 of the LCD panel 200 are different. Based on such circumstance, the user located in the side viewing angle direction can not see the correct image owing that the brightness distribution presented by the LCD panel 200 at the side viewing angles do not comply with the predetermined displayed brightness distribution, which facilitates the privacy protecting effect.

Figure 8:
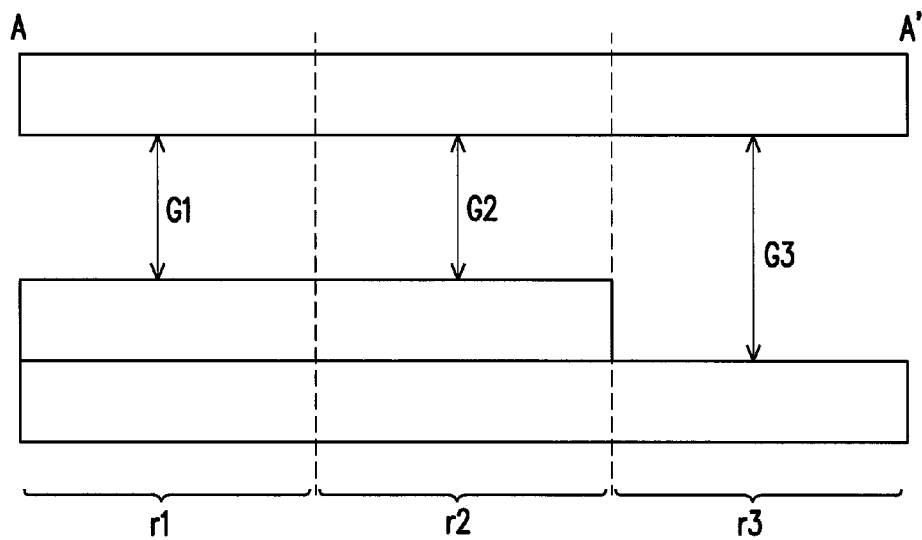
FIG. 8 is a schematic cross-sectional view of the sub-pixel taken along the sectioning line A-A' of FIG. 2.

It is noted that the compensation display areas r3 in all of the sub-pixels 210 are enabled for compensating the brightness presented by the first region R1 and the second region R2 at the viewing angles adjacent to the normal viewing angle when the LCD panel 200 of the present embodiment states in the narrow viewing angle display mode, such that the brightness presented at the viewing angles adjacent to the normal view angle (i.e. the angles ranging between about ±5° polar viewing angles) can be close to the predetermined displayed brightness to mitigate the giddy feeling of the user watching the displayed image in the normal viewing angle direction. In addition, as shown in FIG. 8 which is the cross-sectional view of the sub-pixel 210 taken along the sectioning line A-A' of FIG. 2, the cell gap G3 of the compensation display area r3 in the LCD panel 200 according to the present embodiment is substantially greater than the cell gap G1 of the first display area r1 and the cell gap G2 of the second display area r2. Accordingly, the brightness distribution provided by the compensation display area r3 is more concentrated around the normal viewing angle and the small polar viewing angles than those provided by the first display area r1 and the second display area r2. The compensation display areas r3 can provide the compensation function for compensating the brightness presented in the first region R1 and the second region R2 at the viewing angles adjacent to the normal viewing angle, such that the brightness presented by the first region R1 and the second region R2 at the small side viewing angles of the LCD panel 200 can be close to the predetermined displayed brightness to mitigate the giddy feeling of the user watching the displayed image in the normal viewing angle direction. In the present embodiment, the cell gap G3 of the compensation display area r3 is substantially 7 μm while the cell gap G1 of the first display area r1 and the cell gap G2 of the second display area r2 are substantially 3.5 μm, but the invention is not limited thereto.

In the present embodiment, the LCD panel 200 can provide desirable display quality to the user in the normal viewing angle direction under the narrow viewing angle display mode by lighting the compensation display areas r3 and the compensation is further depicted in the following.

Figure 9A:
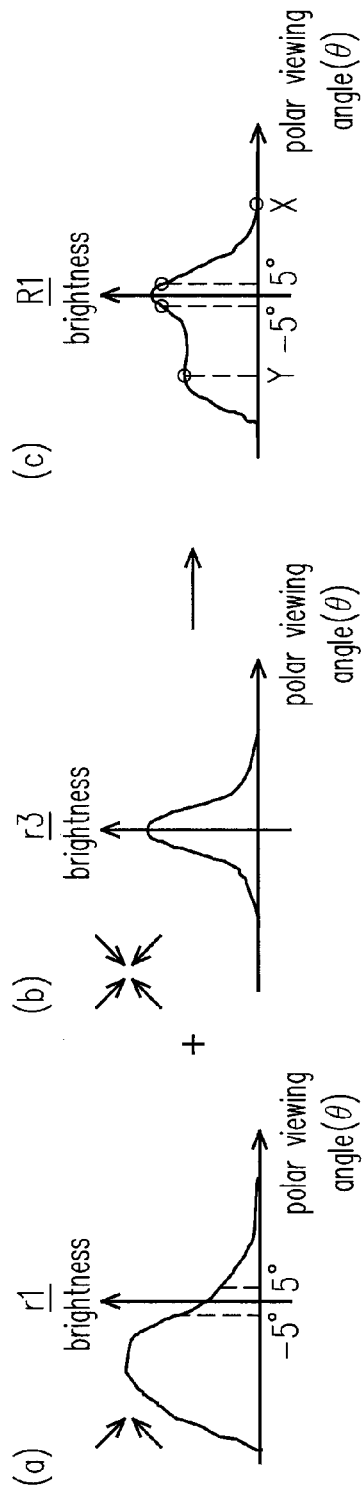
Figure 9B:
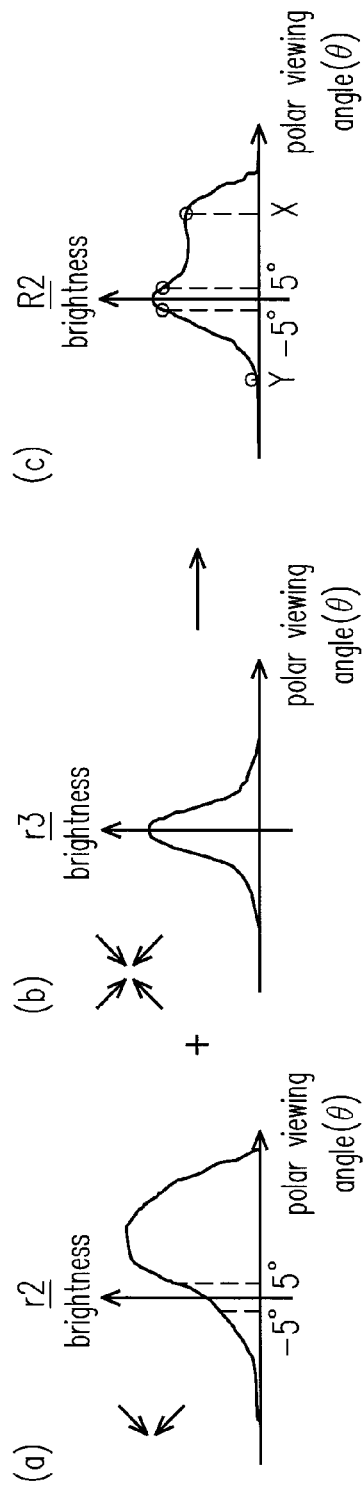

FIG. 9A shows the brightness distribution presented by the enabled different display areas of each sub-pixel in the first region R1 when the LCD panel states in the narrow viewing angle display mode according to an embodiment of the invention. FIG. 9B shows the brightness distribution presented by the enabled different display areas of each sub-pixel in the second region R2 when the LCD panel states in the narrow viewing angle display mode according to an embodiment of the invention. Referring to FIG. 9A and FIG. 9B simultaneously, the relationship between the polar viewing angle θ and the brightness presented by the first display area r1 of the sub-pixel 210 is shown in the drawing (a) of FIG. 9A. The relationship between the polar viewing angle θ and the brightness presented by the second display area r2 of the sub-pixel 210 is shown in the drawing (a) of FIG. 9B. The relationships between the polar viewing angle 6 and the brightness presented by the compensation display areas r3 in the first region R1 and the second region R2 are shown in the drawing (b) of FIG. 9A and in the drawing (b) of FIG. 9B, respectively.

If the compensation display areas r3 are not disposed in the sub-pixels 210 in the first region R1 and the second region R2, the right eye of the user (watching the displayed image at the about 5° polar viewing angle) can receive relative weak brightness presented in the first region R1 and relative strong brightness presented in the second region R2. At the same time, the left eye of the user (watching the displayed image at the about −5° polar viewing angle) can receive relative strong brightness presented in the first region R1 and relative weak brightness presented in the second region R2. As such, the two eyes of the user receive different brightness presented in the same region and the brain of the user fails to determine the actual brightness presented by the first region R1 and the second region R2, which makes the user giddy.

Nevertheless, the LCD panel 200 of the present embodiment has the compensation display areas r3. Under the narrow viewing angle display mode, the distribution between the polar viewing angle θ and the brightness presented by the first region R1 can be the overlap of the distribution between the polar viewing angle θ and the brightness presented by the first display area r1 and the distribution between the polar viewing angle θ and the brightness presented by the compensation display area r3 as shown in the drawing (c) of FIG. 9A. Similarly, the distribution between the polar viewing angle θ and the brightness presented by the second region R2 can be the overlap of the distribution between the polar viewing angle θ and the brightness presented by the second display area r2 and the distribution between the polar viewing angle θ and the brightness presented by the compensation display area r3 as shown in the drawing (c) of FIG. 9B. As shown in the drawing (c) of FIG. 9A and the drawing (c) of FIG. 9B, owing that the sub-pixels 210 in the first region R1 and the second region R2 have the compensation display areas r3, the difference of the brightness from the first region R1 or the second region R2 received by the two eyes of the users can be reduced when all of the compensation display areas r3 are enabled under the narrow viewing angle display mode, which mitigates the problem of giddy feeling of the user watching the displayed image in the normal viewing angle direction. In addition, the cell gap G3 of the compensation display area r3 is substantially greater than the cell gap G1 of the first display area r1 and also substantially greater than the cell gap G2 of the second display area r2. Accordingly, the brightness distribution provided by the compensation display area r3 is more concentrated around the normal viewing angle and the small polar viewing angle than those provided by the first display area r1 and the second display area r2. The compensation display areas r3 can compensate the brightness presented by the first region R1 and the second region R2 at the angles adjacent to the normal viewing angle without significantly influencing on the brightness presented by the first region R1 and the second region R2 at larger polar viewing angles (such as the point marked by X and Y in FIG. 9A and FIG. 9B) so that the brightness presented at the larger polar viewing angles X and Y can be different in the first region R1 and the second region R2. Thereby, the LCD panel 200 can have favorable privacy protecting function.

Specifically, the privacy protecting function of the LCD panel 200 under the narrow viewing angle display mode can be modulated by the configuring area ratio of the first display area r1 (or the second display area r2) and the compensation display area r3. The results listed in table 1 are taken as an example.

TABLE 1

| The ratio of the brightness in the first region R1 and the brightness in the second region R2 | | The polar viewing angle 0 (°) along the horizontal axis direction (0° azimuth viewing angle or 180° azimuth angle) | | |
|---|---|---|---|---|
| | | 5 | 45 | 60 |
| No compensation display areas | | 1.35 | 47.38 | 427.14 |
| The area ratio of the first display area (or the second display area) and the compensation display area | 4:1 | 1.20 | 17.47 | 391.78 |
| | 2:1 | 1.14 | 11.00 | 329.43 |
| | 1:1 | 1.09 | 6.60 | 251.61 |

The ratio of the brightness in the first region R1 and the brightness in the second region R2 at the about 5° polar viewing angle is about 1.35 when the LCD panel 200 does not have the compensation display areas. The ratio of the brightness in the first region R1 and the brightness in the second region R2 at the about 5° polar viewing angle is reduced to about 1.09 when the area ratio of the first display area r1 (or the second display area r2) and the compensation display area r3 is enhanced to about 1:1, which means the brightness in the first region R1 is quite close to the brightness in the second region R2. Therefore, the user watching the image displayed by the LCD panel 200 under the privacy protecting mode does not feel giddy easily when the area ratio of the first display area r1 (or the second display area r2) and the compensation display area r3 is enhanced to about 1:1. The ratio of the brightness in the first region R1 and the brightness in the second region R2 at the about 60° polar viewing angle is about 251.61 when the area ratio of the first display area r1 (or the second display area r2) and the compensation display area r3 is enhanced to about 1:1, which means the brightness in the first region R1 is quite different from the brightness in the second region R2 at the large polar viewing angle. In other words, the LCD panel 200 provides favorable privacy protecting quality when being watched at large polar viewing angle.

Figure 10:
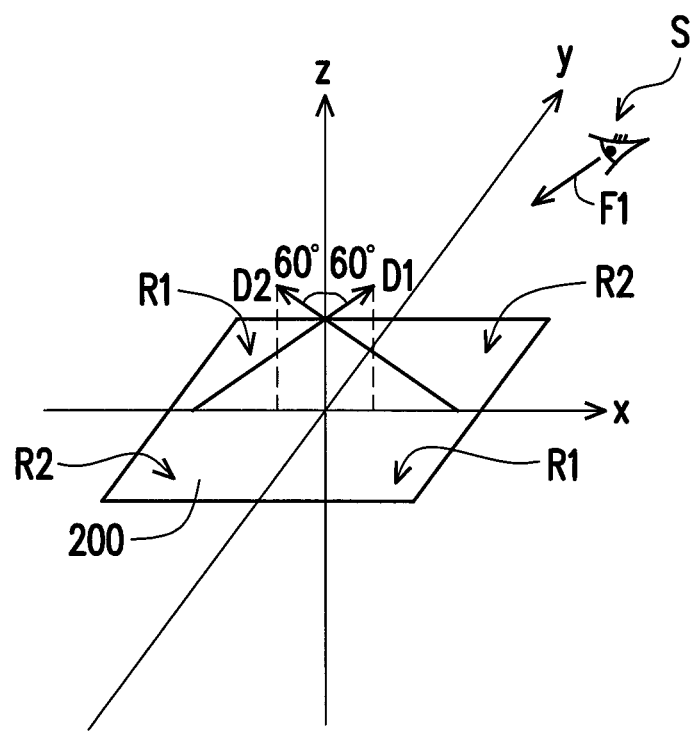
FIG. 10 shows the relationship of the first main alignment vector, the second main alignment vector and the watching direction of the user according to an embodiment of the invention.
Figure 11:
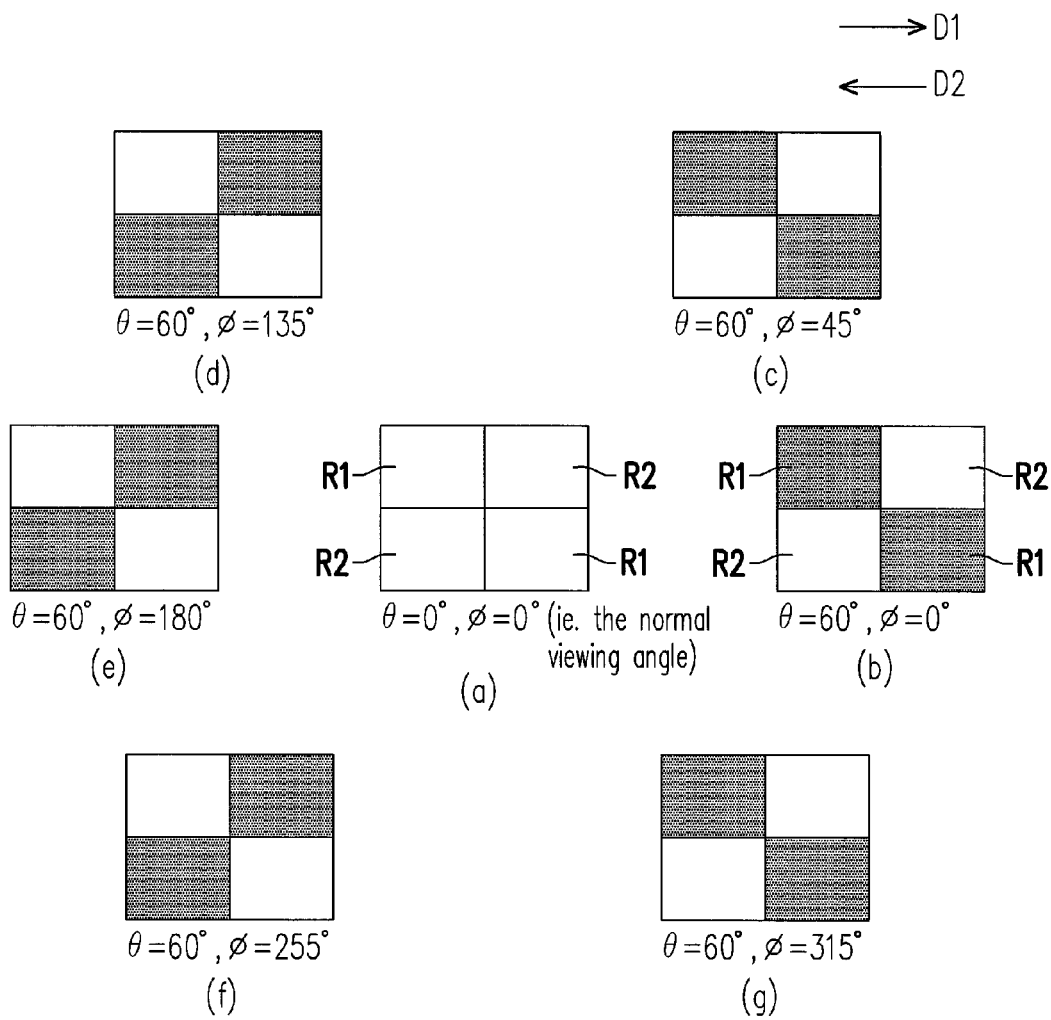
FIG. 11 illustrates the brightness distribution of a portion of the LCD panel under the narrow viewing angle display mode at variant azimuth viewing angles $\Phi$ when the LCD panel is watched at the polar viewing angle $\theta=60°$.

FIG. 10 shows the relationship of the first main alignment vector D1, the second main alignment vector D2, and the watching direction F1 of the user S. FIG. 11 illustrates the brightness distribution presented by a portion of the LCD panel under the narrow viewing angle display mode at variant azimuth viewing angles Φ when the LCD panel is watched at the polar viewing angle θ=60°. Referring to FIG. 10, the LCD panel 200 is assumed to be located at the x-y plane, and the normal direction of the LCD panel 200 is the z direction. The projection of the first main alignment vector D1 on the x-y plane directs towards the +x direction and the first main alignment vector D1 intersects with the z axis by about 60°. The projection of the second main alignment vector D2 on the x-y plane directs towards the −x direction and the second main alignment vector D2 intersects with the z axis by about 60°. Herein, if the user S watches the image displayed by the LCD panel 200 under the narrow viewing angle display mode at the polar viewing angle θ=60° and the azimuth viewing angle Φ=0°, the watching direction F1 of the user S is substantially parallel to the first main alignment vector D1 provided by the first display area r1 in the first region R1 and thus the retardation provided by the liquid crystals in the first display area r1 of the first region R1 is 0 for the user S. As such, the user S watching the LCD panel 200 in the watching direction F1 (polar viewing angle θ=60° and the azimuth viewing angle Φ=0° sees the darker first region R1. Similarly, if the user S watches the image displayed by the LCD panel 200 under the narrow viewing angle display mode at the polar viewing angle θ=60° and the azimuth viewing angle Φ=0°, the watching direction F1 of the user S is not parallel to the second main alignment vector D2 provided by the second display area r2 in the second region R2 and thus the retardation provided by the liquid crystals in the second display area r2 of the second region R2 is not 0 for the user S. The user S watching the LCD panel 200 in the watching direction F1 sees the brighter second region R2. Therefore, the LCD panel 200 provides the noise image having uneven brightness in different regions to the user S located in the side viewing angle direction (as shown in the drawing (b) of FIG. 11), so that the privacy protecting effect is achieved. The LCD panel 200 also provides the noise image having uneven brightness in different regions to the user S located in other side viewing angle directions (as shown in the drawings (c) to (g) of FIG. 11), so that the privacy protecting effect is achieved.

The layout of the sub-pixel disposed in the LCD panel according to the present embodiment is described in detail in the following, wherein the layout designs of the sub-pixels 210 in the first region R1 and the second region R2 can be different and are respectively depicted in the following. Referring to the drawing (a) of FIG. 12, each of the sub-pixels 210 located in the first region R1 can further include a first scan line SL1, a second scan line SL2, a common line CL, a data line DL, a first active device T1, a second active device T2, and a third active device T3 in addition to the first pixel electrode 212, the second pixel electrode 214, and the third pixel electrode 216. The data line DL intersects with the first scan line SL1, the second scan line SL2, and the common line CL. The first active device T1 is driven by the first scan line SL1, and connected with the data line DL, the first pixel electrode 212, and the second pixel electrode 214 to control whether the first pixel electrode 212 and the second electrode 214 are electrically connected to the data line DL. The second active device T2 is driven by the second scan line SL2, and connected with the second pixel electrode 214 and the common line CL to control whether the second pixel electrode 214 is electrically connected to the common line CL. The third active device T3 is driven by the second scan line SL2, and connected with the data line DL and the third pixel electrode 216 to control whether the third pixel electrode 216 is electrically connected to the data line DL.

Figure 12:
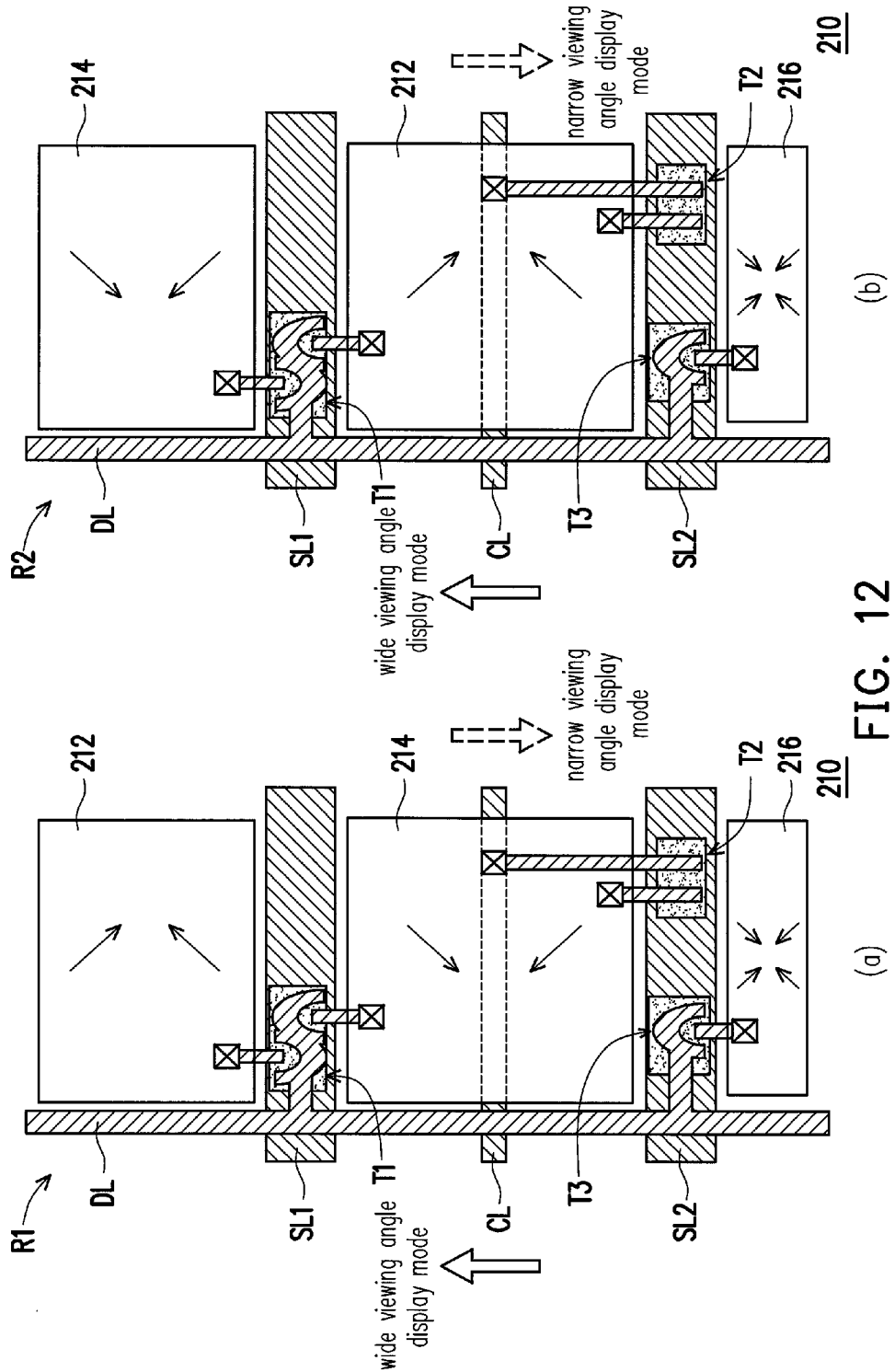
FIG. 12 illustrates one of the driving methods used in driving the LCD panel according to an embodiment of the invention when the LCD panel is predetermined to state in the wide viewing angle display mode (or the narrow viewing angle display mode).

Referring to the drawing (b) of FIG. 12, each of the sub-pixels 210 located in the second region R2 can further include a first scan line SL1, a second scan line SL2, a common line CL, a data line DL, a first active device T1, a second active device T2, and a third active device T3 in addition to the first pixel electrode 212, the second pixel electrode 214, and the third pixel electrode 216. The data line DL intersects with the first scan line SL1, the second scan line SL2, and the common line CL. The first active device T1 is driven by the first scan line SL1, and connected with the data line DL, the first pixel electrode 212, and the second pixel electrode 214 to control whether the first pixel electrode 212 and the second electrode 214 are electrically connected to the data line DL. The second active device T2 is driven by the second scan line SL2, and connected with the first pixel electrode 212 and the common line CL to control whether the first pixel electrode 212 is electrically connected to the common line CL. The third active device T3 is driven by the second scan line SL2, and connected with the data line DL and the third pixel electrode 216 to control whether the third pixel electrode 216 is electrically connected to the data line DL. In short, each sub-pixel 210 located in the second region R2 is similar to each sub-pixel 210 located in the first region R1, except that the relative position of the first pixel electrode 212 and the second pixel electrode 214 in the sub-pixel 210 of the second region R2 is arranged in the way opposite to the relative position of the first pixel electrode 212 and the second pixel electrode 214 in the sub-pixel 210 of the first region R1.

It is noted that the cell gap corresponding to the third pixel electrode 216 in the present embodiment can be greater than the cell gaps corresponding to the first pixel electrode 212 and the second pixel electrode 214 for enhancing the compensation effect provided by the compensation display area r3 corresponding to the third pixel electrode 216. For example, the cell gaps corresponding to the first pixel electrode 212 and the second pixel electrode 214 can be about 3.5 μm and the cell gap corresponding to the third pixel electrode 216 can be about 7 μm. The brightness distribution provided by the compensation display areas r3 at the variant polar viewing angles can be concentrated around the viewing angles adjacent to the normal viewing angle, such that the brightness presented by the first region R1 and the second region R2 of the LCD panel 200 at the small side viewing angles can be close to the predetermined displayed brightness to mitigate the giddy feeling of the user watching the displayed image in the normal viewing angle direction.

The second scan line SL2 can be turned on first when the LCD panel 200 in the present embodiment states in the wide viewing angle display mode and the data line DL can apply a driving voltage to the third pixel electrode 216. Accordingly, the compensation display area r3 in the first region R1 and the second region R2 can present a bright image. In addition, the second pixel electrode 214 located in the first region R1 and the first pixel electrode 212 located in the second region R2 are electrically connected to the common line CL due to the turning on of the second active device T2 by the second scan line SL2. Therefore, the second display areas r2 of the sub-pixels 210 in the first region R1 and the first display areas r1 of the sub-pixels 210 in the second region R2 all display the dark image. Next, the first scan line SL1 is turned on and the data line DL applies a predetermined voltage (i.e. the displayed voltage) to the first pixel electrode 212 and the second pixel electrode 214. Herein, the first display areas r1, the second display areas r2, and the compensation display areas r3 in either the first region R1 or the second region R2 are enabled and lighted to display the image. Thereby, the LCD panel 200 can have wide viewing angle display characteristic. In an alternate embodiment, when the second scan line SL2 is turned on first, the data line DL can apply a driving voltage of about 0V or a dark voltage to the third pixel electrode 216. Thus, the compensation display areas r3 in either the first region R1 or the second region R2 are disabled and merely the first display areas r1 and the second display areas r2 in the first region R1 and the second region R2 are enabled and lighted to display the image.

When the LCD panel 200 in the present embodiment states in the narrow viewing angle display mode, the first scan line SL1 can be turned on first and the data line DL can apply a predetermined driving voltage (such as the corresponding displayed voltage) to the first pixel electrode 212 and the second pixel electrode 214. In the meantime, the first display areas r1 and the second display areas r2 located in both the first region R1 and the second region R2 are enabled and lighted. Next, the second scan line SL2 is turned on and the data line DL applies another predetermined voltage (i.e. another displayed voltage) to the third pixel electrode 216. Accordingly, the compensation display areas r3 in either the first region R1 or the second region R2 are enabled and lighted to display the image. Simultaneously, the second active device T2 is turned on by the second scan line SL2. In the sub-pixel 210 in the first region R1, the second pixel electrode 214 is electrically connected to the common line CL and in the sub-pixel 210 in the second region R2, the first pixel electrode 212 can be electrically connected to the common line CL. Therefore, in the sub-pixels 210 located in the first region R1, the first display areas r1 and the compensation display areas r3 are enabled and lighted while the second display areas r2 are not lighted. In the sub-pixels 210 located in the second region R2, the second display areas r2 and the compensation display areas r3 are enabled and lighted while the first display areas r1 are not lighted.

Thereby, the LCD panel 200 can display the image having the privacy protecting characteristic.

It is noted that the driving method described in the above is achieved by configuring two scan lines and one data lines (i.e. the so-called 2D1G structure) in the LCD panel 200 for switching between the wide viewing angle display mode and the narrow viewing angle display mode rather than by configuring one data line and three scan lines (i.e. so-called 1D3G structure) or by configuring two data lines and two scan lines (i.e. so-called 2G2D structure) in the conventional designs. Accordingly, the LCD panel can have higher aperture ratio and better light transmittance in comparison to the conventional LCD panel.

The Second Embodiment

Figure 13:
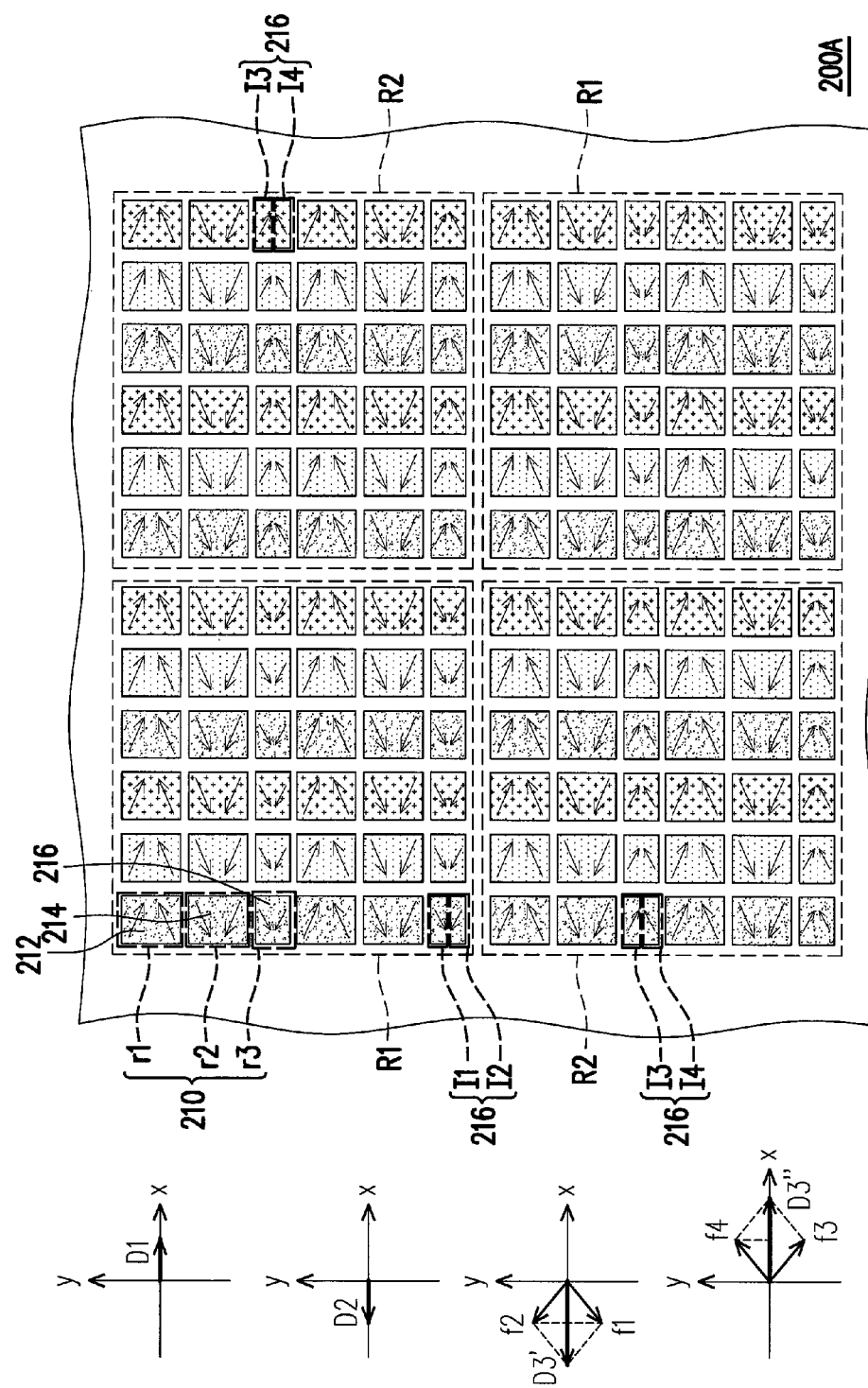

FIG. 13 is a schematic view of an LCD panel according to a second embodiment of the invention. Referring to FIG. 13, the LCD panel 200A is similar to the LCD panel 200 of the first embodiment while the compensation display area r3 of the third pixel electrode in the present embodiment has the design different from the compensation display area r3 of the first embodiment, and the difference therebetween is described in the following. It is noted that the components in the present embodiment the same to those in the first embodiment are not iterated here.

The LCD panel 200A in the present embodiment is divided into at least one first region R1 and at least one second region R2, the first region R1 and the second region R2 respectively have a plurality of sub-pixels 210 arranged in an array, and each of the sub-pixels 210 has the first display area r1 providing the first main alignment vector D1, the second display area r2 providing the second main alignment vector D2, and the compensation display area r3, wherein the directions of the first main alignment vector D1 and the second main alignment vector D2 are opposite to each other.

In specific, the cell gap of the compensation display area r3 is substantially greater than the cell gap of the first display area r1 and also substantially greater than the cell gap of the second display area r2 according to the present embodiment. Furthermore, the compensation display areas r3 in the first region R1 and the second region R2 provide different alignment abilities. The compensation display areas r3 in the regions R1 and R2 are further described in detail in the following.

Figure 14A:
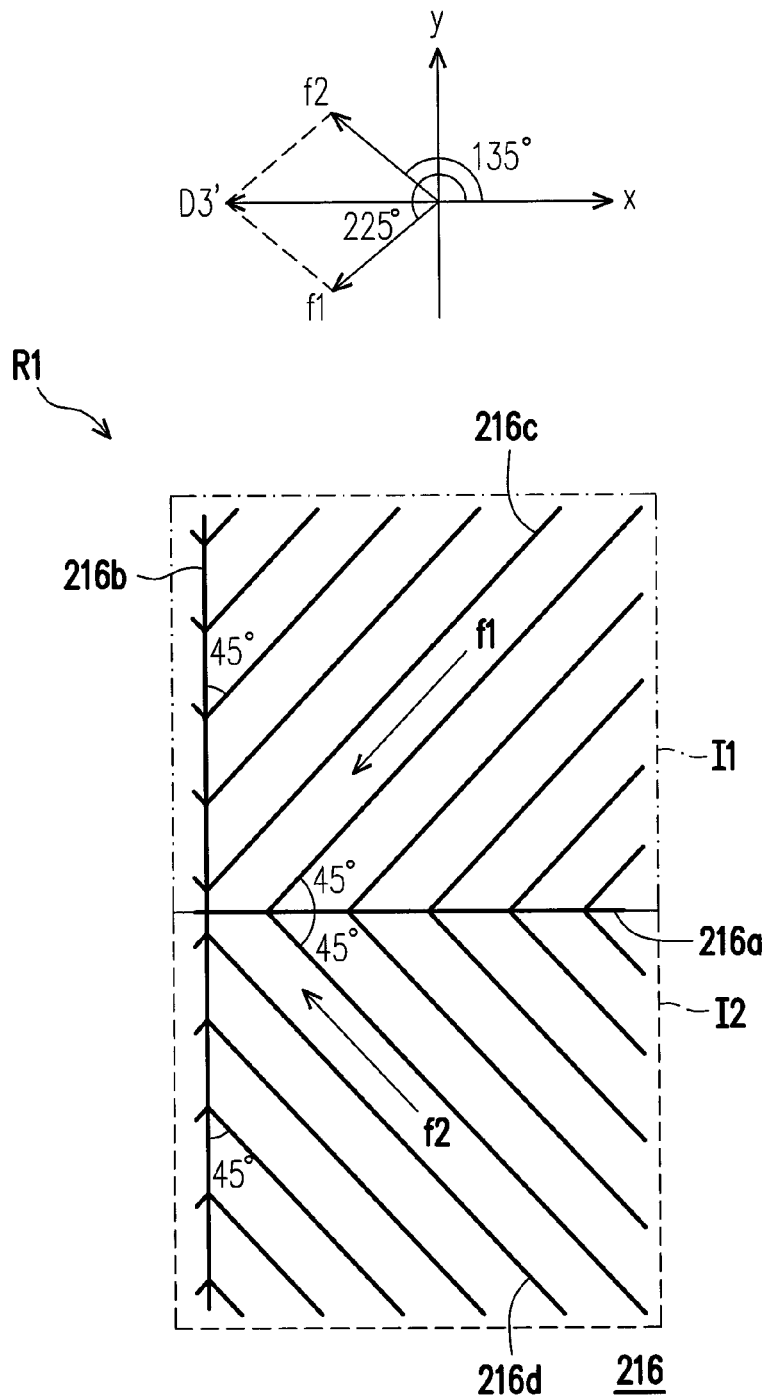

Referring to FIG. 14A, the third pixel electrode 216 located in the first region R1 has a first compensation alignment area I1 and a second compensation alignment area I2, and a vector sum (i.e. the main compensation alignment vector D3') of a first compensation alignment vector f1 of the first compensation alignment area I1 and a second compensation alignment vector f2 of the second compensation alignment area I2 is substantially parallel to the second main alignment vector D2. In other words, the vector sum (i.e. the main compensation alignment vector D3') has the direction opposite to the direction of the first main alignment vector D1 of the first display area r1 in the first region R1. The main compensation alignment vector D3' can provide the compensation effect to the first display area r1 in the first region R1 when the LCD panel 200A states in the narrow viewing angle display mode.

The first compensation alignment vector f1 and the second compensation alignment vector f2 provided by the third pixel electrode 216 in the first region R1 can be achieved by various ways. For instance, the first compensation alignment vector f1 and the second compensation alignment vector f2 of the third pixel electrode 216 in the first region R1 can be achieved by the pattern design of the third pixel electrode 216 shown in FIG. 14A. In the present embodiment, the third pixel electrode 216 can include two third main trunk portions 216a and 216b and a plurality of third branch portions 216c and 216d connected with the third main trunk portion 216a or the third main trunk portion 216b, wherein the extending direction of the third main trunk portion 216a is substantially parallel to the x direction and the extending direction of the third main trunk portion 216b is substantially parallel to the y direction. The third main trunk portion 216a is substantially parallel to the x direction divides the third pixel electrode 216 into the first compensation alignment area I1 and the second compensation alignment area I2. The third branch portions 216c are disposed in the first compensation alignment area I1 and intersect with the third main trunk portion 216a or the third main trunk 216b by about 45 degrees. The third branch portions 216d are disposed in the second compensation alignment area I2 and intersect with the third main trunk portion 216a or the third main trunk portion 216b by about 45 degrees. In addition, the third branch portions 216c and the third branch portions 216d are not parallel to each other.

According to the x direction depicted in FIG. 14A, the direction of the first compensation alignment vector f1 provided by the third branch portions 216c in the first compensation alignment area I1 intersects with the x direction by about 225°. The direction of the second compensation alignment vector f2 provided by the third branch portion 216d in the second compensation alignment area I2 intersects with the x direction by about 135°. Accordingly, the direction of the vector sum (i.e. the main compensation alignment vector D3') of the first compensation alignment vector f1 and the second compensation alignment vector f2 directs toward the −x direction.

Figure 14B:
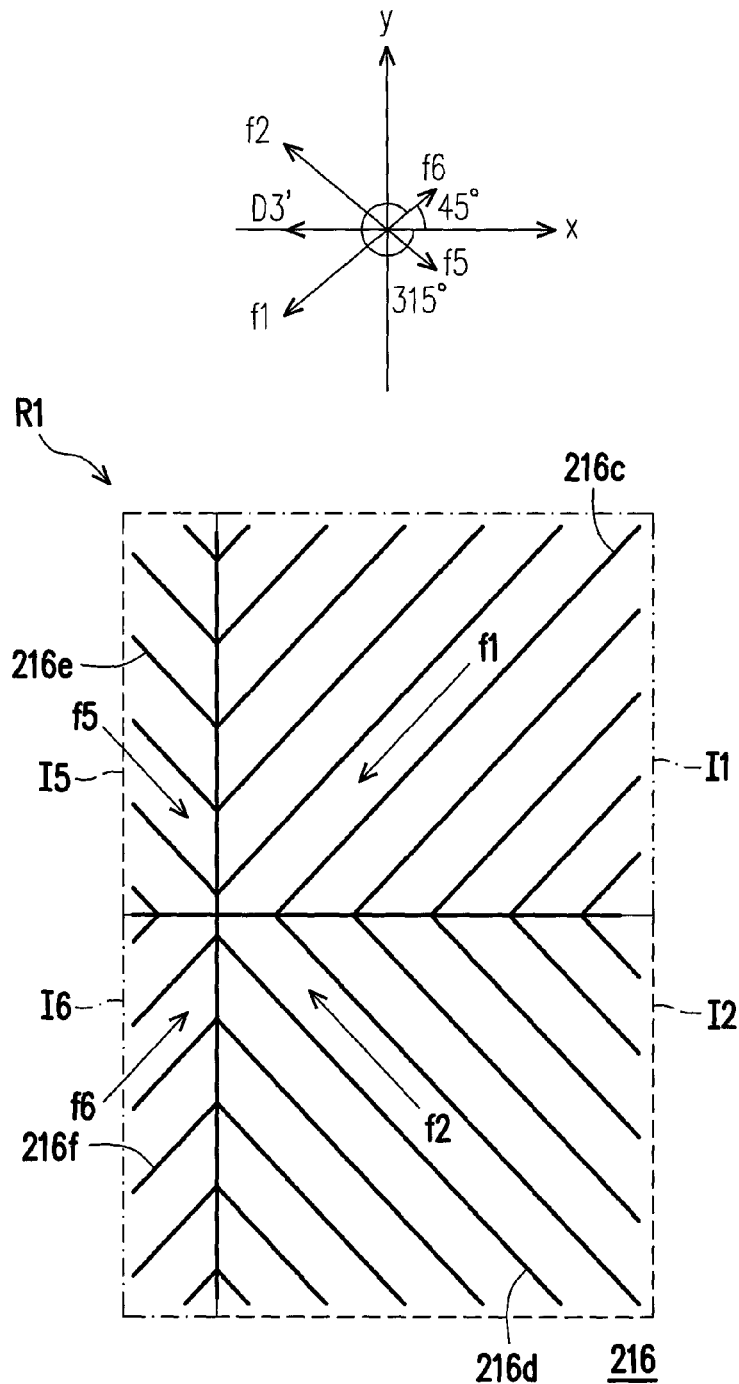

However, the invention is not limited thereto. The third pixel electrode 216 can be designed as that shown in FIG. 14B, wherein a fifth compensation alignment area I5 and a sixth compensation alignment area I6 can be further demarked in the third pixel electrode 216 located in the first region R1 by the third main trunk portions 216a and 216b in addition to the first compensation alignment area I1 and the second compensation alignment area I2. Herein, the first compensation alignment vector f1 of the first compensation alignment area I1, the second compensation alignment vector f2 of the second compensation alignment area I2, a fifth compensation alignment vector f5 of the fifth compensation alignment area I5, and a sixth compensation alignment vector f6 of the sixth compensation alignment area I6 together construct the main compensation alignment vector D3'.

In addition, the third pixel electrode 216 located in the first region R1 according to the present embodiment can further include a plurality of third branch portions 216e and 216f connected with the third main trunk portion 216a or the third main trunk portion 216b, wherein the third branch portions 216e are located in the fifth compensation alignment area I5 and the third branch portions 216f are located in the sixth compensation alignment area I6. The direction of the fifth compensation alignment vector f5 provided by the third branch portions 216e in the fifth compensation alignment area I5 intersects with the x direction by about 315°. The direction of the sixth compensation alignment vector f6 provided by the third branch portions 216f in the sixth compensation alignment area I6 intersects with the x direction by about 45°. The direction of the vector sum (i.e. the main compensation alignment vector D3') of the first compensation alignment vector f1, the second compensation alignment vector f2, the fifth compensation alignment vector f5, and the sixth compensation alignment vector f6 directs toward the −x direction.

Referring to FIG. 13 again, the third pixel electrode 216 located in the second region R2 has a third compensation alignment area I3 and a fourth compensation alignment area I4, and a vector sum (i.e. the main compensation alignment vector D3") of a third compensation alignment vector f3 of the third compensation alignment area I3 and a fourth compensation alignment vector f4 of the fourth compensation alignment area I4 is substantially parallel to the first main alignment vector D1. In other words, the vector sum (i.e. the main compensation alignment vector D3") formed by the third compensation alignment vector f3 and the fourth compensation alignment vector f4 has the direction opposite to the direction of the second main alignment vector D2 of the second display area r2 in the second region R2, such that the main compensation alignment vector D3" can provide the compensation effect to the second display area r2 located in the second region R2 when the LCD panel 200A states in the narrow viewing angle display mode.

The third compensation alignment vector f3 and the fourth compensation alignment vector f4 of the third pixel electrode 216 in the second region R2 can be achieved by various ways. For instance, the third compensation alignment vector f3 and the fourth compensation alignment vector f4 of the third pixel electrode 216 in the second region R2 can be achieved by the pattern design of the third pixel electrode 216 shown in FIG. 15A. In the present embodiment, the third pixel electrode 216 located in the second region R2 can include two third main trunk portions 216a and 216b and a plurality of third branch portions 216c and 216d connected with the third main trunk portion 216a or the third main trunk portion 216b, wherein the extending direction of the third main trunk portion 216a is parallel to the x direction and the extending direction of the third main trunk portion 216b is parallel to the y direction. The third main trunk portion 216a is substantially parallel to the x direction divides the third pixel electrode 216 into the third compensation alignment area I3 and the fourth compensation alignment area I4. The third branch portions 216c are disposed in the third compensation alignment area I3 and intersects with the third main trunk portion 216a or the third main trunk portion 216b by about 45 degrees. The third branch portions 216d are disposed in the fourth compensation alignment area I4 and intersects with the third main trunk portion 216a or the third main trunk portion 216b by about 45 degrees. In addition, the third branch portions 216c and the third branch portions 216d are not parallel to each other.

Figure 15A:
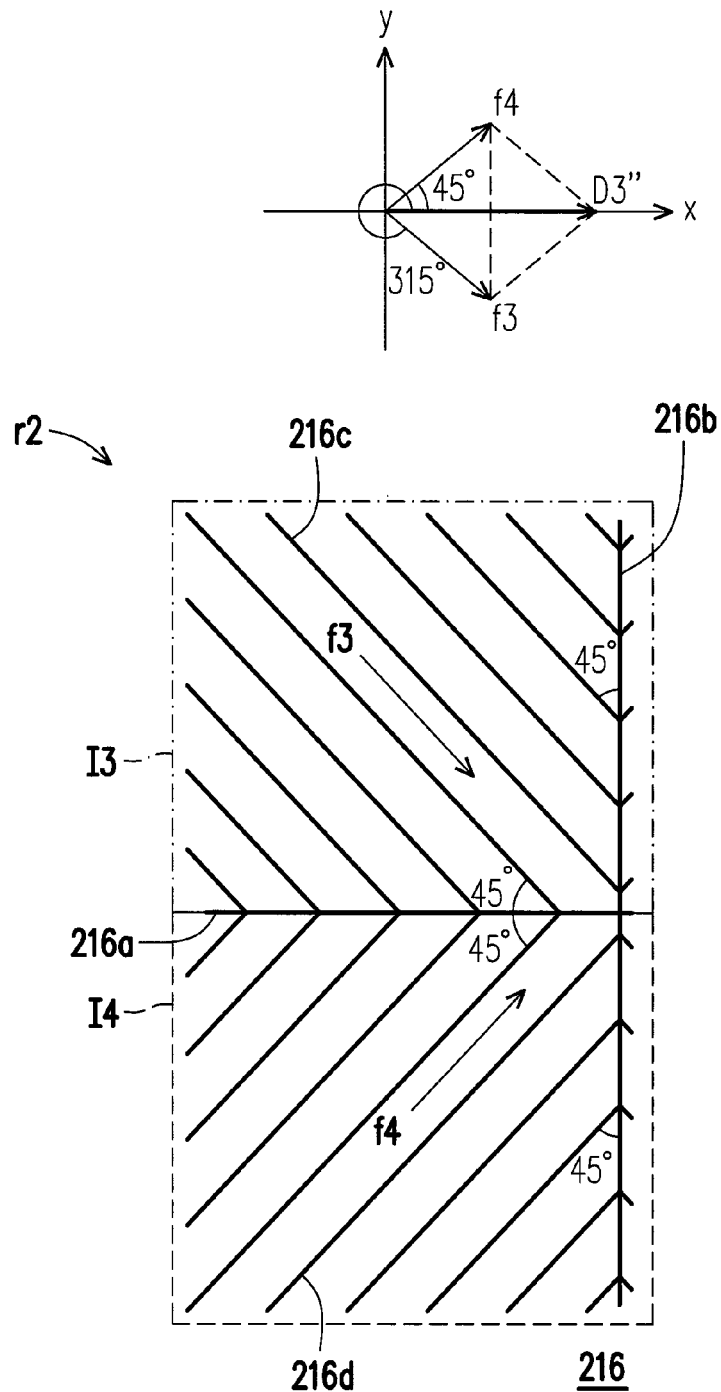

According to the x direction depicted in FIG. 15A, the direction of the third compensation alignment vector f3 provided by the third branch portions 216c in the third compensation alignment area I3 intersects with the x direction by about 315°. The direction of the fourth compensation alignment vector f4 provided by the third branch portions 216d in the fourth compensation alignment area I4 intersects with the x direction by about 45°. Accordingly, the direction of the vector sum (i.e. the main compensation alignment vector D3") of the third alignment vector f3 and the fourth alignment vector f4 directs toward the +x direction.

Figure 15B:
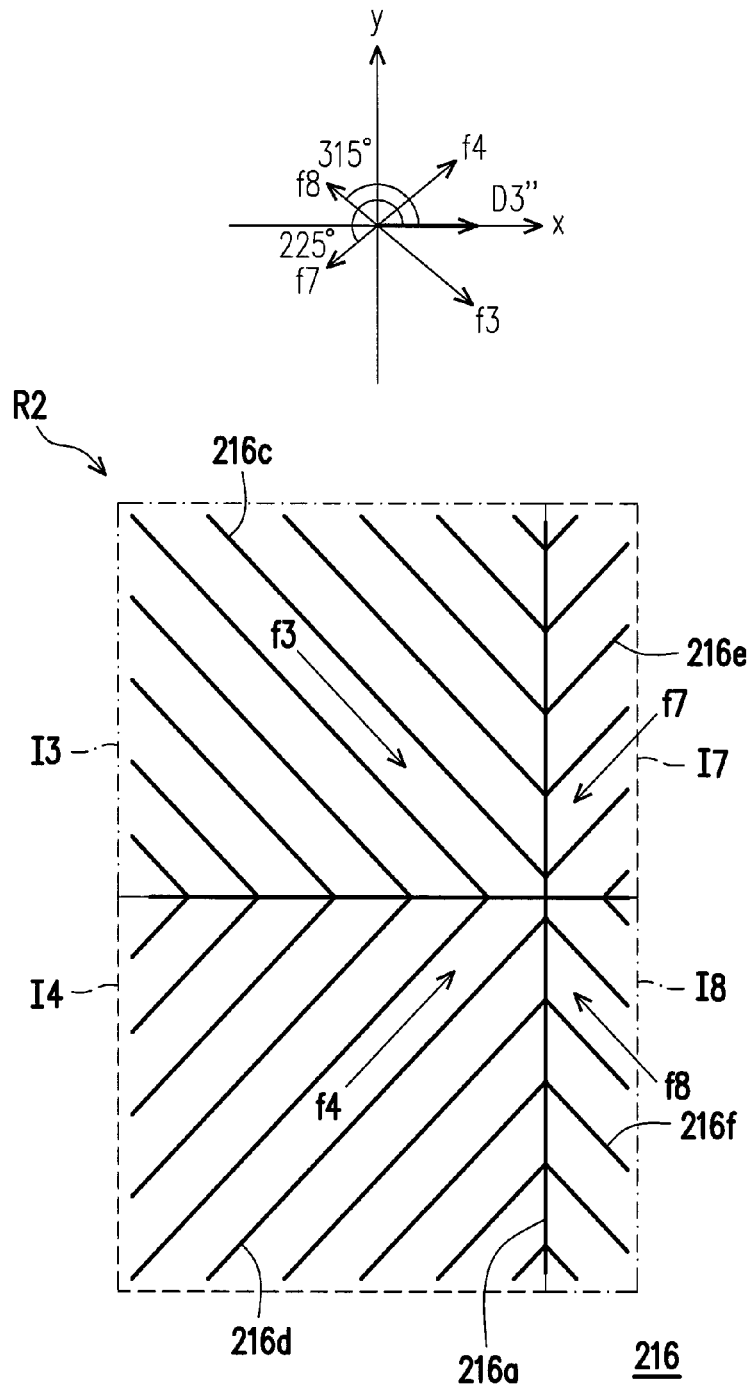

However, the invention is not limited thereto. The third pixel electrode 216 located in the second region R2 can be designed as that shown in FIG. 15B, wherein a seventh compensation alignment area I7 and a eighth compensation alignment area I8 can be further demarked in the third pixel electrode 216 located in the second region R2 by the third main trunk portions 216a and 216b in addition to the third compensation alignment area I3 and the fourth compensation alignment area I4. Herein, the third compensation alignment vector f3 of the third compensation alignment area I3, the fourth compensation alignment vector f4 of the fourth compensation alignment area I4, a seventh compensation alignment vector f7 of the seventh compensation alignment area 17, and a eighth compensation alignment vector f8 of the eighth compensation alignment area 18 together construct the main compensation alignment vector D3".

In addition, the third pixel electrode 216 located in the second region R2 according to the present embodiment can further include a plurality of third branch portions 216e and 216f connected with the third main trunk portion 216a or the third main trunk portion 216b, wherein the third branch portions 216e are located in the seventh compensation alignment area 17 and the third branch portions 216f are located in the eighth compensation alignment area 18. The direction of the seventh compensation alignment vector f7 provided by the third branch portions 216e in the seventh compensation alignment area 17 intersects with the x direction by about 225°. The direction of the eighth compensation alignment vector f8 provided by the third branch portions 216f in the eighth compensation alignment area 18 intersects with the x direction by about 135°. The direction of the vector sum (i.e. the main compensation alignment vector D3") of the third compensation alignment vector f3, the fourth compensation alignment vector f4, the seventh compensation alignment vector f7, and the eighth compensation alignment vector f8 directs toward the +x direction, i.e. parallel to the first main alignment vector D1.

Figure 16:
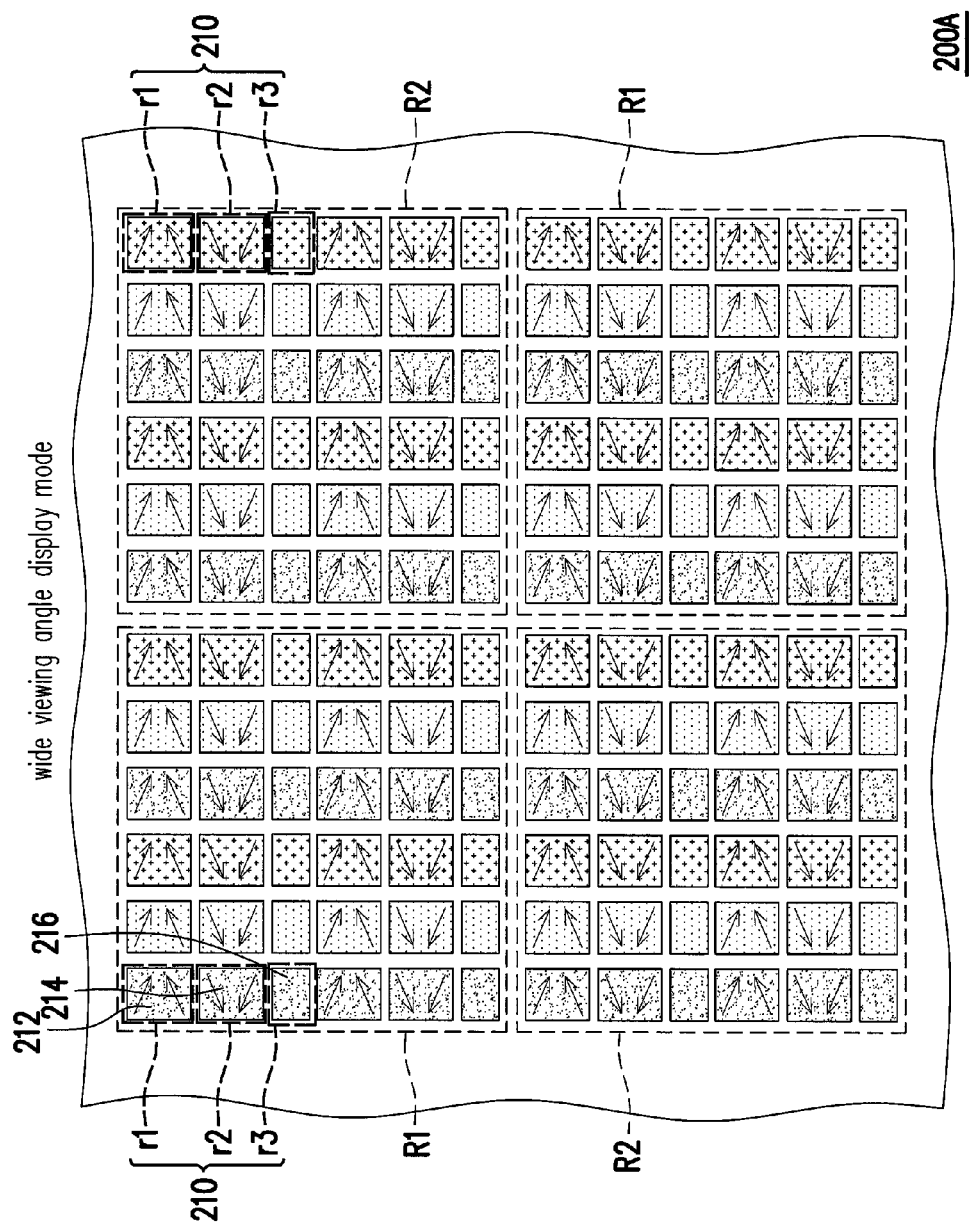

FIG. 16 is a schematic view of an LCD panel under the wide viewing angle display mode according to the second embodiment of the invention. Referring to FOG. 16, all the first display areas r1 and all the second display areas r2 of the sub-pixels 210 in the first region R1 and the second region R2 are enabled when the LCD panel 200A states in the wide viewing angle display mode. Furthermore, the compensation display areas r3 in all the sub-pixels 210 located in the first region R1 and the second region R2 are disabled. Herein, the first display area r1 and the second display area r2 in each sub-pixel 210 provide brightness and the displayed brightness presented by each sub-pixel 210 at variant viewing angles complies with the predetermined displayed brightness because the first main alignment vector D1 of the first display area r1 differs from the second main alignment vector D2 of the second display area r2, such that the LCD panel 200A has the wide viewing angle display characteristic.

Figure 17:
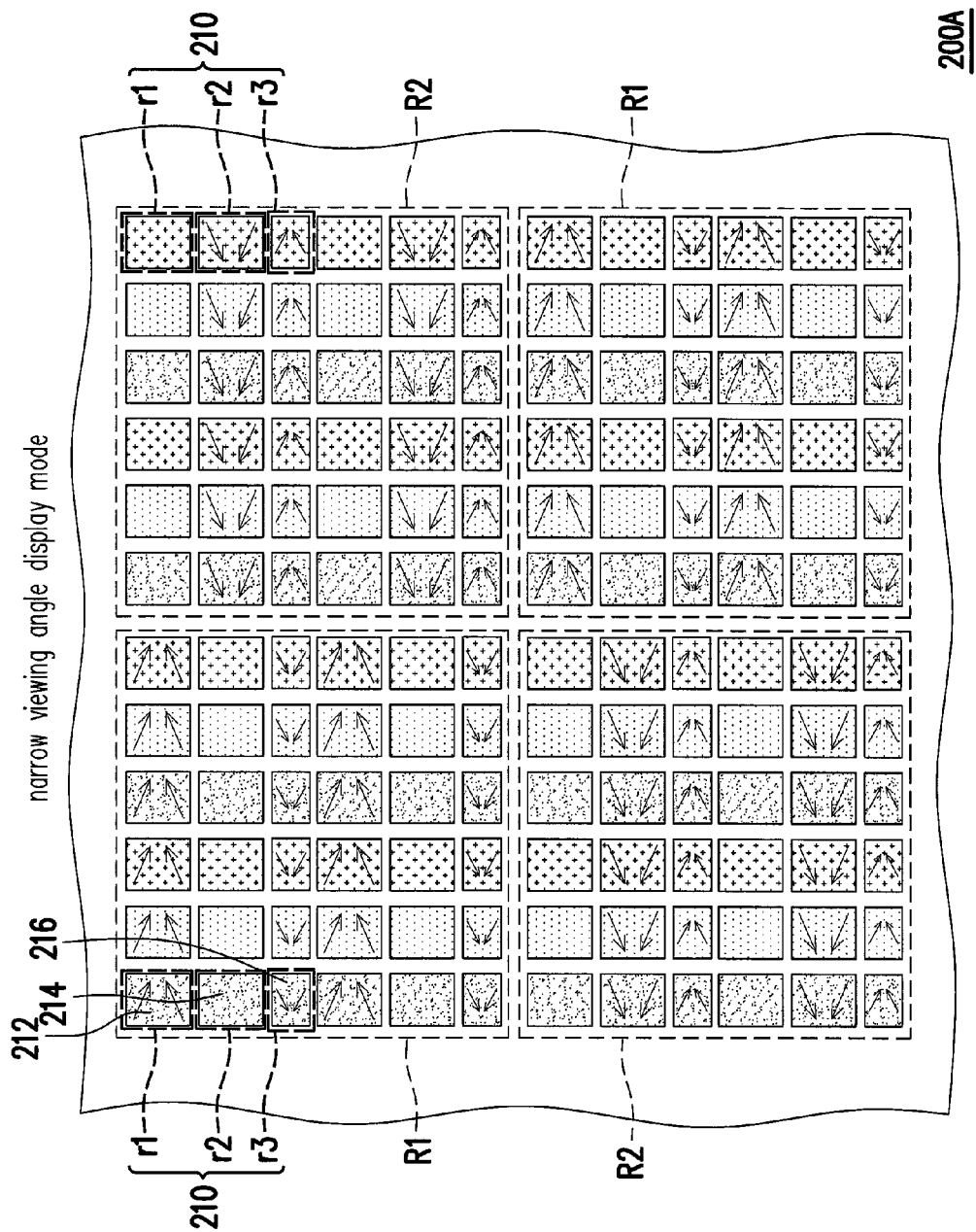

FIG. 17 is a schematic view of an LCD panel under the narrow viewing angle display mode according to the second embodiment of the invention. Referring to FIG. 17, the first region R1 and the second region R2 are operated by different methods when the LCD panel 200A states in the narrow viewing angle display mode. Specifically, driving voltages of the first display areas r1 in the first region R1 are substantially greater than driving voltages of the second display areas r2 in the first region R1 and driving voltages of the first display areas r1 in the second region R2 are substantially smaller than driving voltages of the second display areas r2 in the second region R2 when the LCD panel 200A states in the narrow viewing angle display mode. For instance, in the first region R1, the first display area r1 and the compensation display area r3 of each sub-pixel 210 are enabled while the second display area r2 of each sub-pixel 210 is disabled. In addition, in the second region R2, the first display area r1 of each sub-pixel 210 is disabled and the second display area r2 and the compensation display area r3 of each sub-pixel 210 are enabled. The first main alignment vector D1 of the first display area r1 has the direction opposite to the direction of the second main alignment vector D2 of the second display area r2, such that the brightness distributions in the first region R1 and the second region R2 of the LCD panel 200A are different from each other. Based on such circumstance, the user located in the side viewing angle direction can not see the correct image owing that the brightness distribution presented at the side viewing angles by the LCD panel 200A do not comply with the predetermined displayed brightness distribution, which facilitates the privacy protecting effect.

It is noted that the compensation display areas r3 in all of the sub-pixels 210 are enabled for compensating the brightness presented in the first region R1 and the second region R2 at the viewing angles adjacent to the normal viewing angle when the LCD panel 200A of the present embodiment states in the narrow viewing angle display mode, such that the brightness presented at the viewing angles adjacent to the normal view angle (i.e. the angles located in the range between about ±5° polar viewing angle) can be close to the predetermined displayed brightness to mitigate the giddy feeling of the user watching the displayed image in the normal viewing angle direction.

In other words, the LCD panel 200A under the narrow viewing angle display mode can provide desirable display quality to the user in the normal viewing angle direction by lighting the compensation display areas r3 and the compensation is further depicted in the following.

FIG. 18A shows the brightness distribution (the relationship between the polar viewing angle θ and the brightness) presented by the enabled different display areas of each sub-pixel in the first region R1 when the LCD panel states in the narrow viewing angle display mode according to the present embodiment of the invention. FIG. 18B shows the brightness distribution (the relationship between the polar viewing angle θ and the brightness) presented by the enabled different display areas of each sub-pixel in the second region R2 when the LCD panel states in the narrow viewing angle display mode according to the present embodiment of the invention. Referring to FIG. 18A and FIG. 18B, the relationship between the polar viewing angle θ and the brightness presented by the first display area r1 of the sub-pixel 210 is shown in the drawing (a) of FIG. 18A. The relationship between the polar viewing angle θ and the brightness presented by the second display area r2 of the sub-pixel 210 is shown in the drawing (a) of FIG. 18B. The relationships between the polar viewing angle θ and the brightness presented by the compensation display areas r3 in the first region R1 and the second region R2 are shown in the drawing (b) of FIG. 18A and in the drawing (b) of FIG. 18B, respectively.

As shown in the drawing (a) of FIG. 18A and the drawing (a) of FIG. 18B, if the compensation display areas r3 are not disposed in the sub-pixels 210 in the first region R1 and the second region R2, the right eye of the user (watching the displayed image in the about 5° polar viewing angle) can receive relative weak brightness presented in the first region R1 and relative strong brightness presented in the second region R2 because the brightness in the first region R1 is only provided by the first display areas r1 and the brightness in the second region R2 is only provided by the second display areas r2. At the same time, the left eye of the user (watching the displayed image in the about −5° polar viewing angle) can receive relative strong brightness presented in the first region R1 and relative weak brightness presented in the second region R2. As a result, the user may feel giddy owing that the two eyes respectively receive different brightness presented by the same area.

Nevertheless, the LCD panel 200A of the present embodiment is configured with the compensation display areas r3. Under the narrow viewing angle display mode, the distribution between the polar viewing angle θ and the brightness presented in the first region R1 can be the overlap of the distribution between the polar viewing angle θ and the brightness presented by the first display area r1 and the distribution between the polar viewing angle θ and the brightness presented by the compensation display area r3 as shown in the drawing (c) of FIG. 18A. Similarly, the distribution between the polar viewing angle θ and the brightness presented in the second region R2 can be the overlap of the distribution between the polar viewing angle θ and the brightness presented by the second display area r2 and the distribution between the polar viewing angle θ and the brightness presented by the compensation display area r3 as shown in the drawing (c) of FIG. 18B. It is shown in the drawing (c) of FIG. 18A and the drawing (c) of FIG. 18B that the compensation display areas r3 are enabled in the sub-pixels 210 in the first region R1 and the second region R2, such that the difference of the brightness from the first region R1 or the second region R2 received by the two eyes of the users can be reduced under the narrow viewing angle display mode, which mitigates the problem of giddy feeling of the user watching the displayed image in the normal viewing angle direction.

It is noted that the cell gap of the compensation display area r3 can be greater than the cell gaps of the other display areas r1 and r2 so that the brightness distribution presented by the compensation display area r3 with respect to variant polar viewing angles θ is relative concentrated. Furthermore, the compensation display areas r3 provide different main compensation alignment vectors D3' and D3" in different regions R1 and R2. Therefore, the design of the present embodiment is conducive to enhance the display quality of the LCD panel 200A at the normal viewing angle and the compensation display areas r3 can have smaller area. As such, the disabled compensation display areas r3 have smaller area when the LCD panel 200A states in the wide viewing angle display mode, which is conducive to achieving higher light transmittance. The results listed in table 2 are taken as an example.

such, the disabled display areas occupy smaller area when the LCD panel 200A states in the wide viewing angle display mode, which is conducive to achieving higher light transmittance of the LCD panel 200A under the wide viewing angle display mode.

In addition, the driving method of the LCD panel 200A in the present embodiment under the narrow viewing angle display mode is similar to the driving method of the LCD panel 200 in the first embodiment, which is not iterated here. Nevertheless, the driving method of the LCD panel 200A in the present embodiment under the wide viewing angle display mode is different from the driving method of the LCD panel 200 in the first embodiment. The difference therebetween lies in that the driving voltage of about 0V or a dark voltage is applied to the third pixel electrodes 216 when the LCD panel 200A in the present embodiment states in the wide viewing angle display mode such that the compensation display areas r3 in the first region R1 and the second region R2 can display a dark image. Namely, the first display areas r1 and the second display areas r2 located in both the first region R1 and the second region R2 display the bright image while the compensation display areas r3 display the dark image. Thereby, the LCD panel 200A can have the wide viewing angle display characteristic.

The Third Embodiment

The LCD panel in this embodiment utilizes the compensation design similar to the LCD panel described in the second embodiment. However, in the present embodiment, each of the compensation display areas is directly connected with the display areas to accomplish the compensation effect and further mitigate giddy feeling of the user watching the image displayed by the LCD panel in the normal viewing angle direction.

Figure 19:
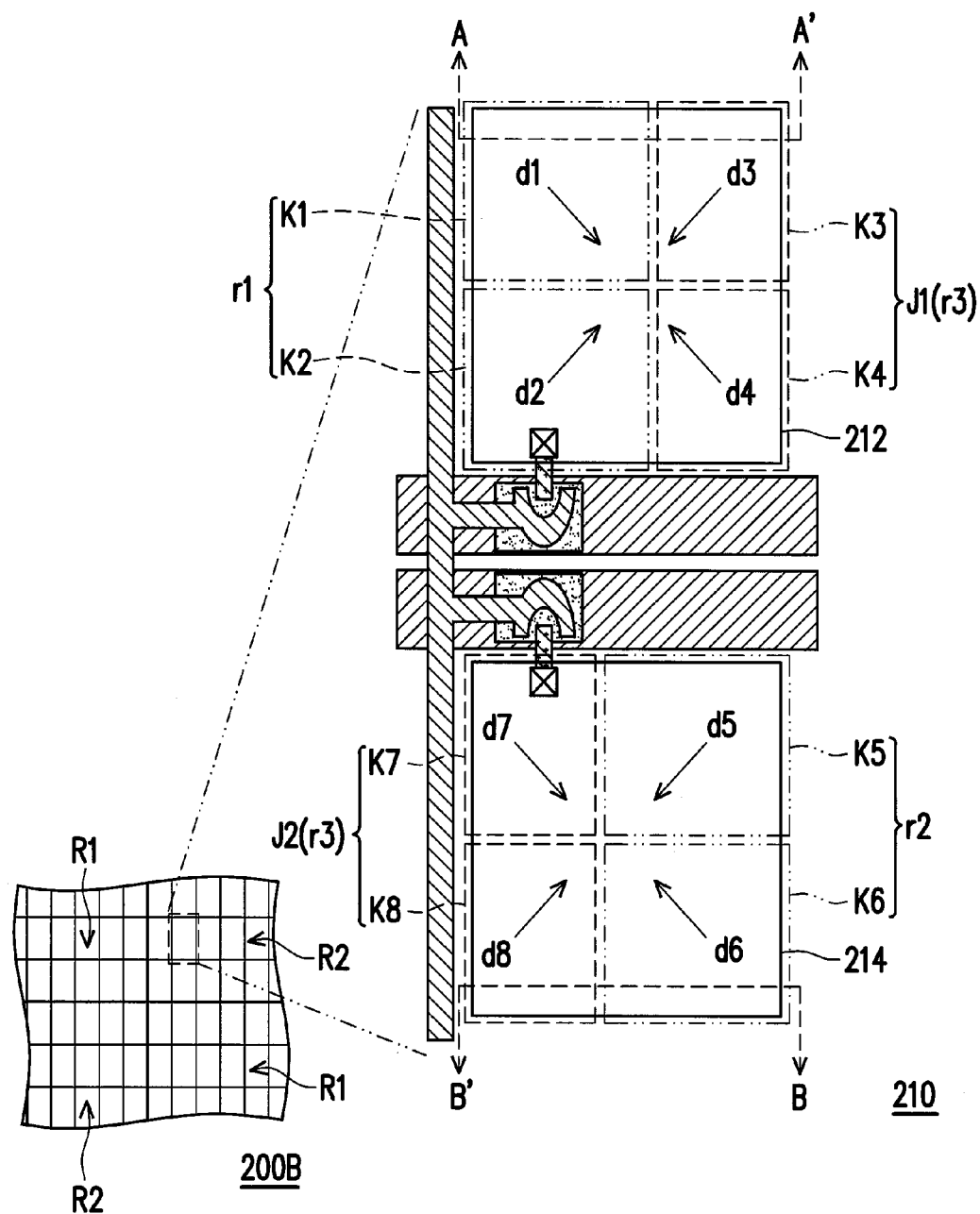
Figure 20:
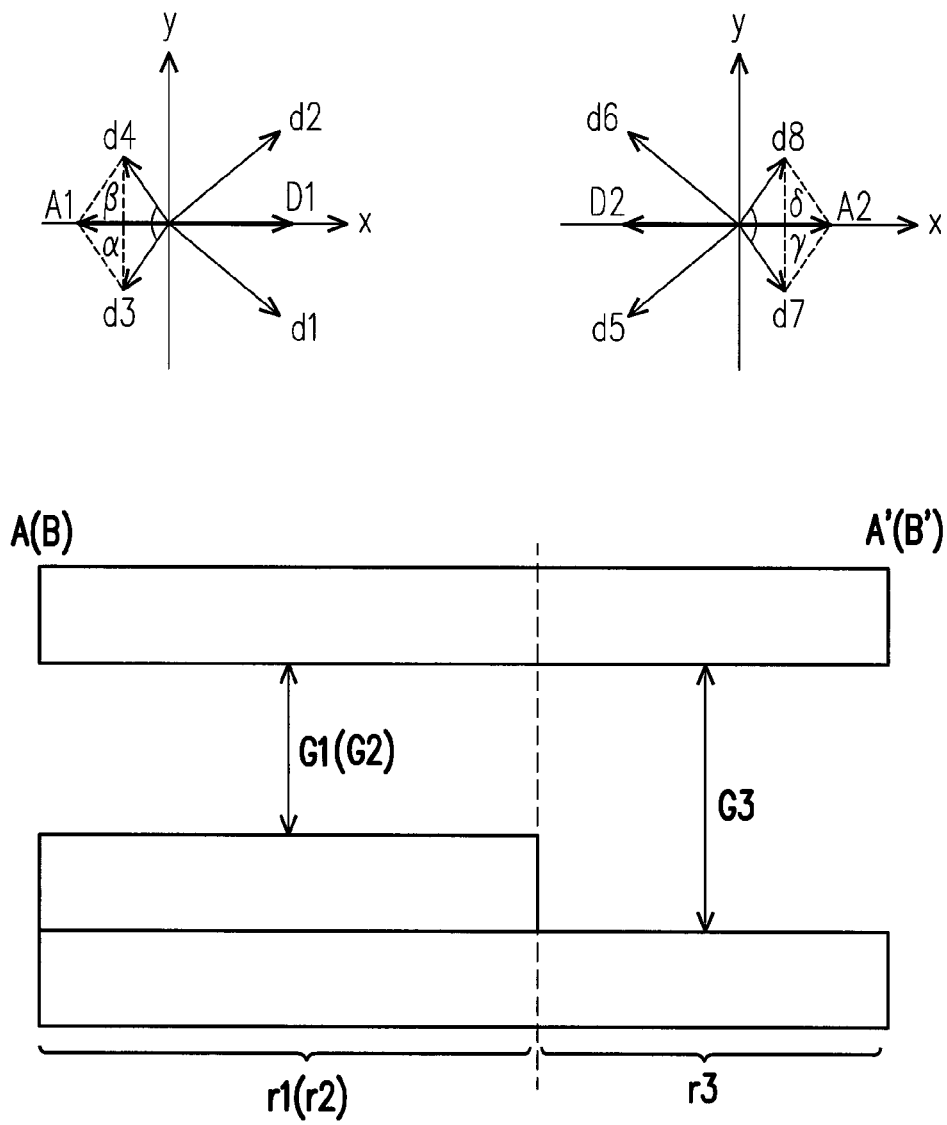
FIG. 20 is a schematic cross-sectional view of the sub-pixel taken along the sectioning line A-A' and the sectioning line B-B' of FIG. 19.

FIG. 19 is a schematic view of an LCD panel according to a third embodiment of the invention. Referring to FIG. 19, an LCD panel 200B in this embodiment is divided into at least one first region R1 and at least one second region R2. The first region R1 and the second region R2 respectively have a plurality of sub-pixels 210 arranged in an array and each of the sub-pixels 210 has the first display area r1 providing the first main alignment vector D1, the second display area r2 providing the second main alignment vector D2, and the compensation display area r3. The directions of the first main alignment vector D1 and the second main alignment vector D3 are opposite to each other. The cell gap G3 of the compensation display area r3 is substantially greater than the cell gap G1 of the first display area r1 and also substantially greater than the cell gap G2 of the second display area r2 as shown in FIG. 20.

Furthermore, the compensation display area r3 in each of the sub-pixels 210 has a first compensation display area J1 and a second compensation display area J2. The first com-

TABLE 2

| The ratio of the brightness in the first region R1 and the brightness in the second region R2 | | The polar viewing angle θ (°) along the horizontal axis direction (0° azimuth viewing angle or 180° azimuth angle) | | |
|---|---|---|---|---|
| | | 5 | 45 | 60 |
| No compensation display areas | | 1.35 | 47.38 | 427.14 |
| The area ratio of the first display area (or the second display area) and the compensation display area | 8:1 | 1.21 | 13.83 | 113.61 |
| | 4:1 | 1.12 | 8.09 | 64.98 |
| | 1.75:1 | 1.01 | 3.92 | 31.40 |

As shown in table 2, the ratio of the brightness in the first region R1 and the brightness in the second region R2 at the about 5° polar viewing angle is about 1.12 when the area ratio of the first display area r1 (or the second display area r2) and the compensation display area r3 in the LCD panel 200A is enhanced to about 4:1, which means the brightness in the first region R1 is almost identical to the brightness in the second region R2 at the about 5° polar viewing angle. As pensation display area J1 and the first display area r1 are connected and are driven simultaneously, i.e. the first compensation display area J1 and the first display area r1 are enabled simultaneously or disabled simultaneously. The second compensation display area J2 and the second display area r2 are connected and are driven simultaneously, i.e. the second compensation display area J2 and the second display area r2 are enabled simultaneously or disabled simultaneously. It is noted that the area of the first compensation display area J1 is not greater than the area of the first display area r1 and the area of the second compensation display area J2 is not greater than the second display area r2.

In the present embodiment, each of the sub-pixels 210 includes the first pixel electrode 212 and the second pixel electrode 214. The first display area r1 and the first compensation display area J1 are defined by the first pixel electrode 212 and the second display area r2 and the second compensation display area J2 are defined by the second pixel electrode 214.

The first pixel electrode 212 in the present embodiment can have a first alignment area K1, a second alignment area K2, a third alignment area K3, and a fourth alignment area K4, wherein the first alignment area K1 and the second alignment area K2 together construct the first display area r1 and the third alignment area K3 and the fourth alignment area K4 together construct the first compensation display area J1. The first alignment vector d1 of the first alignment area K1, the second alignment vector d2 of the second alignment area K2, the third alignment vector d3 of the third alignment area K3, and the fourth alignment vector d4 of the fourth alignment area K4 together construct the first main alignment vector D1 and the vector sum of the third alignment vector d3 and the fourth alignment vector d4 is A1 as shown in FIG. 20.

It is noted that the included angle α formed by the third alignment vector d3 and the x direction and the included angle β formed by the fourth alignment vector d4 and the x direction are preferably greater than or equal to about 45 degrees and smaller than about 90 degrees. As such, the first compensation display area J1 applied by high driving voltage (the voltage applied to the first pixel electrode 212) can provide the compensation effect to the first display area r1 when the LCD panel 200B in the present embodiment states in the narrow viewing angle display mode.

In the present embodiment, the second pixel electrode 214 has a fifth alignment area K5, a sixth alignment area K6, a seventh alignment area K7, and an eighth alignment area K8, the fifth alignment area K5 and the sixth alignment area K6 construct the second display area r2, the seventh alignment area K7 and the eighth alignment area K8 construct the second compensation display area J2, a vector sum of a fifth alignment vector d5 of the fifth alignment area K5, a sixth alignment vector d6 of the sixth alignment area K6, a seventh alignment vector d7 of the seventh alignment area K7, and an eighth alignment vector d8 of the eighth alignment area K8 construct the second main alignment vector D2, and a vector sum of the seventh alignment vector d7 and the eighth alignment vector d8 is A2 as shown in FIG. 20. In the present embodiment, the direction of the vector sum A1 can be identical to the second main alignment vector D2 and the direction of the vector sum A2 can be identical to the first main alignment vector D1.

It is noted that the included angle γ formed by the seventh alignment vector d7 and the x direction and the included angle δ formed by the eighth alignment vector d8 and the x direction are preferably greater than or equal to about 45 degrees and smaller than about 90 degrees. As such, the second compensation display area J2 applied by high driving voltage (the voltage applied to the second pixel electrode 214) can provide the compensation effect to the second display area r2 when the LCD panel 200B in the present embodiment states in the narrow viewing angle display mode.

All the first display areas r1 and all the second display areas r2 in the first region R1 and the second region R2 are enabled when the LCD panel 200B states in the wide viewing angle display mode. Accordingly, all the first display areas r1, all the second display areas r2, all the first compensation display areas J1, and all the second compensation display area J2 in the first region R1 and the second region R2 are enabled when the LCD panel 200B states in the wide viewing angle display mode. Herein, the displayed brightness of each sub-pixel 210 at variant viewing angles is sufficient because the first main alignment vector D1 formed by the first display area r1 and the first compensation display area J1 has the direction differs from the direction of the second main alignment vector D2 formed by the second display area r2 and the second compensation display area J2, such that the LCD panel 200B has the wide viewing angle display characteristic.

The first region R1 and the second region R2 are operated by different methods when the LCD panel 200B states in the narrow viewing angle display mode. Specifically, driving voltages of the first display areas r1 in the first region R1 are substantially greater than driving voltages of the second display areas r2 in the first region R1 and driving voltages of the first display areas r1 in the second region R2 are substantially smaller than driving voltages of the second display areas r2 in the second region R2 when the LCD panel 200B states in the narrow viewing angle display mode. For instance, in the first region R1, the first display area r1 of each sub-pixel 210 is enabled and the second display area r2 of each sub-pixel 210 is disabled. Herein, only a portion of the compensation display areas r3 in the first region R1 are enabled, i.e. only the first compensation display areas J1 among the compensation display areas r3 in the first region R1 are enabled, while the second compensation display areas J2 are disabled. In addition, in the second region R2, the first display area r1 of each sub-pixel 210 is disabled and the second display area r2 of each sub-pixel 210 is enabled. Herein, only a portion of the compensation display areas r3 in the second region R2 are enabled, i.e. only the second compensation display areas J2 among the compensation display areas r3 in the second region R2 are enabled, while the first compensation display areas J1 are disabled.

The first display areas r1 and the first compensation display areas J1 in the first region R1 are enabled while the second display areas r2 and the second compensation display areas J2 in the first region R1 are disabled, and the second display areas r2 and the second compensation display areas J2 in the second region R2 are enabled while the first display areas r1 and the first compensation display areas J1 in the second region R2 are disabled when the LCD panel 200B states in the narrow viewing angle display mode. Accordingly, each sub-pixel 210 in the first region R1 provides displayed brightness by the first display areas r1 and the first compensation display areas J1 and each sub-pixel 210 in the second region R2 provides the displayed brightness by the second display areas r2 and the second compensation display areas J2. The first main alignment vector D1 provided by the first display area r1 and the first compensation display area J1 has the direction opposite to the direction the second main alignment vector D2 provided by the second display area r2 and the second compensation display area J2, such that the brightness distributions in the first region R1 and the second region R2 of the LCD panel 200B are different from each other. Based on such circumstance, the user located in the side viewing angle direction can not see the correct image owing that the brightness distribution presented by the LCD panel 200B at the side viewing angles do not comply with the predetermined displayed brightness distribution, which facilitates the privacy protecting effect.

In addition, as shown in FIG. 20 which is the cross-sectional view of the sub-pixel 210 taken along the sectioning line A-A' and sectioning line B-B' of FIG. 19, the cell gap G3 of the compensation display area r3 in the LCD panel 200B according to the present embodiment is substantially greater than the cell gap G1 of the first display area r1 and the cell gap G2 of the second display area r2. Accordingly, the brightness distribution provided by the compensation display area r3 is more concentrated around the normal viewing angle and the small polar viewing angle than that provided by the first display area r1 and the second display area r2. The compensation display areas r3 can provide the compensation function for compensating the brightness presented in the first region R1 and the second region R2 at the viewing angles adjacent to the normal viewing angle, such that the brightness presented by the first region R1 and the second region R2 of the LCD panel 200 at the small side viewing angles can be close to the predetermined displayed brightness to mitigate the giddy feeling of the user watching the displayed image in the normal viewing angle direction. The results listed in tables 3 and 4 are taken as an example.

G1=G2=3.5 μm; G3=7 μm

TABLE 3

| The ratio of the brightness in the first region R1 and the brightness in the second region R2 | Driving voltage (V) | | | | | | |
|---|---|---|---|---|---|---|---|
| | 2.3 | 2.6 | 2.9 | 3.2 | 3.5 | 4 | 5 |
| Polar viewing angle (θ) θ = 5° | 1.33 | 1.12 | 1.00 | 1.07 | 1.11 | 1.12 | 1.08 |
| θ = 45° | 1.08 | 1.64 | 3.36 | 6.60 | 5.98 | 3.03 | 1.54 |
| θ = 60° | 1.58 | 3.21 | 13.74 | 136.01 | 10.43 | 3.01 | 1.46 |

G1=G2=G3=3.5 μm

TABLE 4

| The ratio of the brightness in the first region R1 and the brightness in the second region R2 | Driving voltage (V) | | | | | | |
|---|---|---|---|---|---|---|---|
| | 2.3 | 2.6 | 2.9 | 3.2 | 3.5 | 4 | 5 |
| Polar viewing angle (θ) θ = 5° | 2.27 | 1.63 | 1.39 | 1.26 | 1.18 | 1.11 | 1.04 |
| θ = 45° | 8.73 | 99.23 | 108.54 | 14.63 | 6.11 | 2.87 | 1.55 |
| θ = 60° | 3.92 | 11.82 | 94.16 | 139.87 | 16.34 | 4.60 | 1.85 |

The table 3 shows the ratio of the brightness in the first region R1 and the brightness in the second region R2 at variant polar viewing angles θ with respect to different driving voltages applied to the first pixel electrodes 212 in the first region R1 and the second pixel electrodes 214 in the second region R2 when the LCD panel 200B of the present embodiment states in the narrow viewing angle display mode. The table 4 shows the ratio of the brightness in the first region R1 and the brightness in the second region R2 at variant polar viewing angles θ with respect to different driving voltages according to a compared example when the LCD panel of the compared example states in the narrow viewing angle display mode. The difference between the LCD panel of the present embodiment and the LCD panel of the compared example lies in that in the LCD panel of the present embodiment, the cell gap G1 of the first display areas r1 and the cell gap G2 of the second display areas r2 are about 3.5 μm while the cell gap G3 of the compensation display areas r3 is about 7 μm and in the LCD panel of the compared example, the cell gap G1 of the first display areas r1, the cell gap G2 of the second display areas r2, and the cell gap G3 of the compensation display areas r3 are about 3.5 μm.

Comparing the tables 3 and 4, the ratio of the brightness in the first region R1 and the brightness in the second region R2 is close to 1.1 under variant driving voltages and at the about 5° polar viewing angle when the cell gap G3 of the compensation display areas 3r is increased to about 7 μm. That is to say, the brightness in the first region R1 and the brightness in the second region R2 are quite close under variant driving voltages and at the about 5° polar viewing angle when the cell gap G3 of the compensation display areas 3r is increased to about 7 μm, which is conducive to mitigate the giddy feeling of the user watching the display image under the narrow viewing angle display mode in the normal viewing angle direction.

The Fourth Embodiment

Figure 21:
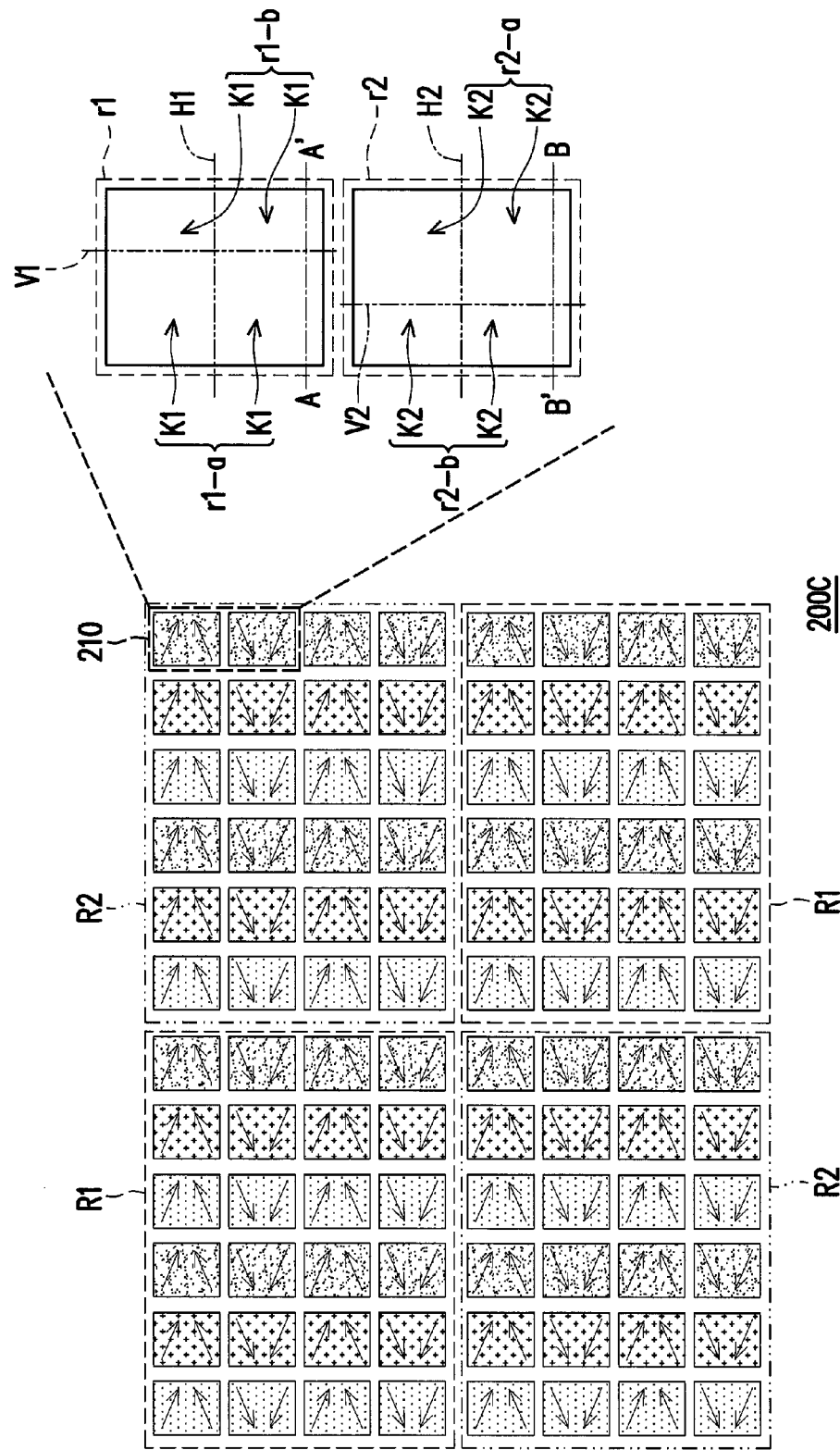
Figure 22A:
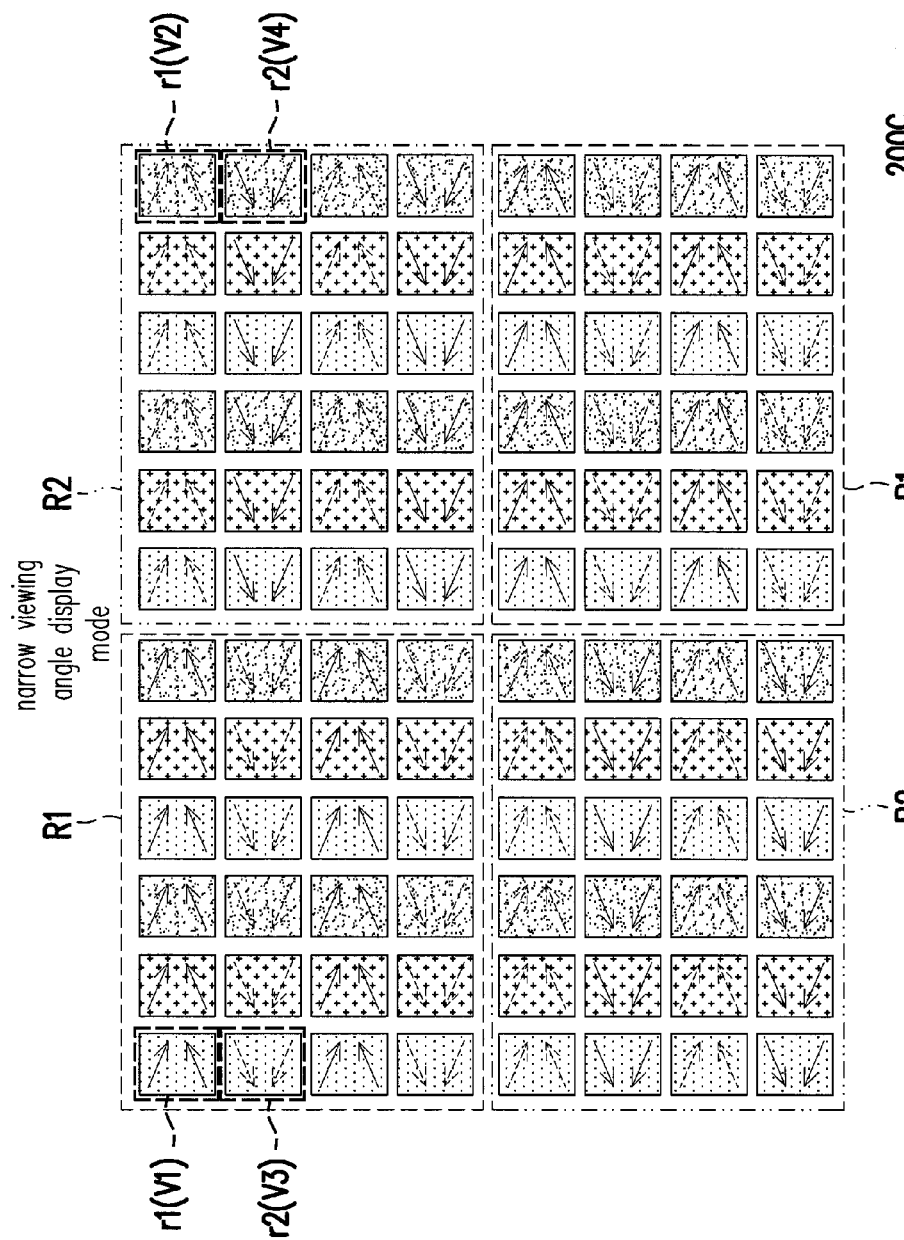
Figure 22B:
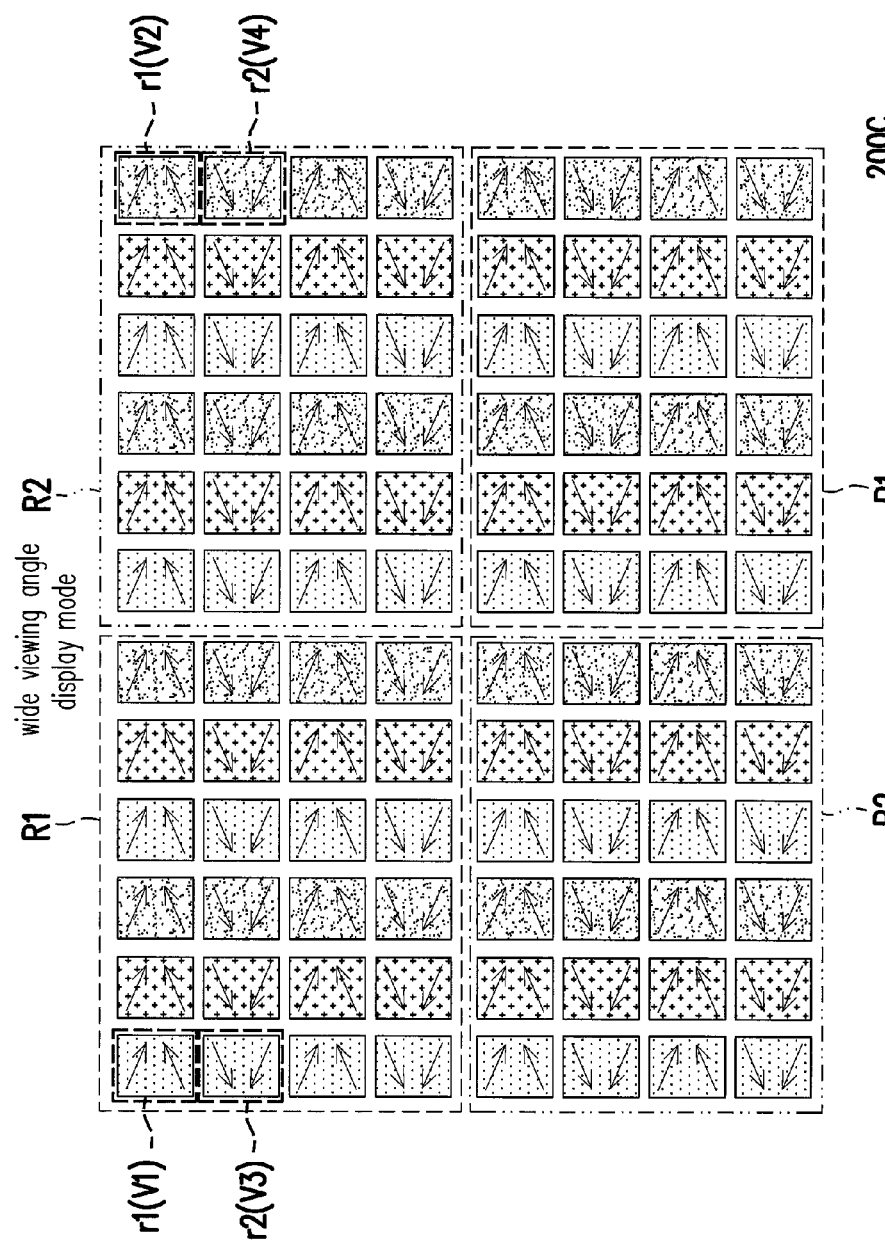

FIG. 21 is a schematic diagram of a pixel structure according to a sub-pixel in one LCD panel of one embodiment of the invention. FIG. 22A and FIG. 22B illustrate the display status of the LCD panel using the sub-pixel depicted in FIG. 21 under the wide viewing angle display mode and the narrow viewing angle display mode, respectively.

As shown in FIG. 21, FIG. 22A, and FIG. 22B, an LCD panel 200C is divided into at least one first region R1 and at least one second region R2. Two first regions R1 and two second regions R2 illustrated in FIG. 21 are taken as an example. The first regions R1 and the second regions R2 respectively are formed with a plurality of sub-pixels 210, wherein the color displayed by the sub-pixels 210 can include red, green, blue, yellow, and the like, but the invention is not limited thereto. Each of the sub-pixels 210 includes a first display area r1 and a second display area r2. The first display area r1 is divided into a plurality of first alignment areas K1 by a first horizontal baseline H1 and a first vertical baseline V1, and the first alignment areas K1 respectively have a liquid crystal alignment.

Specifically, the first horizontal baseline H1 divides the first display area r1 evenly such that the liquid crystal alignment in the first display area r1 is symmetrically distributed along the first horizontal baseline H1. The first vertical baseline V1 divides the first display area r1 into the first sub-display area r1-a and the second sub-display area r2-a, wherein the area of the first sub-display area r1-a differs from the area of the second sub-display area r1-b. In the present embodiment, the area of the first sub-display area r1-a is substantially greater than the area of the second display area r1-b and the cell gap of the first sub-display area r1-a can be identical to or different from the cell gap of the second sub-display area r1-b. For example, the cell gap of the first sub-display area r1-a can be substantially smaller than the cell gap of the second sub-display area r1-b.

The second display area r2 is divided into a plurality of second alignment areas K2 by the second horizontal baseline H2 and the second vertical baseline V2. Each of the second alignment areas K2 has a liquid crystal alignment and the liquid crystal alignments of the second alignment areas K2 are different from each other. The second horizontal baseline H2 divides the second display area r2 evenly such that the liquid crystal alignments of the second display area r2 are symmetrically distributed with respect to the second horizontal baseline H2 while the second vertical baseline V2 divides the second display area r2 unevenly into a third sub-display area r2-a and a fourth sub-display area r2-b having an area different from an area of the third sub-display area r2-a. In the present embodiment, the area of the third sub-display area r2-a is substantially greater than the area of the fourth display area r2-b and the cell gap of the third sub-display area r2-a can be substantially identical to or different from the cell gap of the fourth sub-display area r2-b. For example, the cell gap of the third sub-display area r2-a can be substantially smaller than the cell gap of the fourth sub-display area r2-b.

Based on the aforesaid description, the pixel structure having asymmetric structure with respect to the horizontal direction is provided as shown in FIG. 21, FIG. 22A, and FIG. 22B.

The currently provided pixel structure which has the liquid crystal alignment asymmetrically distributed with respect to the horizontal direction is achieved by dividing the LCD panel into a plurality of display blocks (such as the first regions R1 and the second regions R2) respectively having the alignment different from one another, wherein the display blocks are alternatively arranged in the line direction and the row direction. Moreover, the display blocks are, for example, arranged in the checkerboard arrangement when being switched to the narrow viewing angle display mode. During displaying the image, the sub-pixels in one display block turn on one of the display areas therein and thus the user located in the side viewing angle direction sees various brightness distribution, which causes the image interference.

However, owing that the left eye and the right eye of the user are separated by a distance, the left eye and the right eye of the user see the image displayed by the LCD panel at the angle ranging about the about ±5° polar viewing angle rather than at about 0° polar angle when the user is located in the normal viewing angle direction. The variance of the viewing angles can cause the left eye and the right eye of the user to see different displayed brightness, which makes the parallax when the user watches the displayed image in the normal viewing angle direction. The phenomenon is further worse in the pixel structure having the liquid crystal alignment asymmetrically distributed with respect to the horizontal direction.

To mitigate the parallax in the present embodiment, the display areas predetermined to be turned off are not completely turned off during displaying the image. That is, a lower gray voltage rather than about 0V can be applied to the display areas predetermined to be turned off, such that the difference between the brightness received by the left eye and the right eye of the user at the viewing angles between about +5° polar viewing angle and about −5° polar viewing angle can be reduced. Simultaneously, with respect to the compensation voltage applied to the display areas predetermined to be turned off, a fixed voltage can be served as the compensation voltage no matter the value of the gray level the image is predetermined to display, or variant voltages can be served as the compensation voltages corresponding to the value of the gray level the image is predetermined to display for compensating the parallax caused in different displayed gray levels to a certain extent. The lower the compensation voltage the better the privacy protecting effect and the higher the compensation voltage the smaller the parallax extent in the normal viewing angle.

More specifically, in the LCD panel shown in FIG. 21, FIG. 22A, and FIG. 22B, a first driving voltage V1 of the first display areas r1 displaying a first normal viewing brightness in the first region R1 is substantially greater than a second driving voltage V2 of the first display areas r1 displaying the first normal viewing brightness in the second region R2, and the second driving voltage V2 is substantially greater than 0 when the LCD panel 200C states in the narrow viewing angle mode.

In addition, the first driving voltage V1 of the first display areas r1 displaying the first normal viewing brightness in the first region R1 is substantially greater than a third driving voltage V3 of the second display areas r2 displaying the first normal viewing brightness in the first region R1, and the first driving voltage V1 of the first display areas r1 displaying the first normal viewing brightness in the first region R1 is substantially equal to a fourth driving voltage V4 of the second display areas r2 displaying the first normal viewing brightness in the second region R2 when the LCD panel 200C states in the narrow viewing angle mode. The third driving voltage V3 of the second display areas r2 displaying the first normal viewing brightness in the first region R1 is substantially equal to the second driving voltage V2 of the first display areas r1 displaying the first normal viewing brightness in the second region R2. It is noted that the driving method of the LCD panel 200C mentioned above can be apply in the LCD panel 200B of the third embodiment to facilitate the LCD panel 200B of the third embodiment having better display effect.

According to the following table 5, under the condition that the cell gaps of the first and the second display areas r1 and r2 in the first region R1 and the second region R2 are the same, the ratio of the brightness in the first and the second regions R1 and R2 seen by the left eye and the right eye of the user at the about 5° polar viewing angle is changed from about 1.377 to about 1.306 when the driving voltage (i.e. the second or the third voltage mentioned above) of the second display area r2 displaying the first normal viewing brightness in the first region R1 for compensating the parallax is about 2.175V, which mitigates the parallax effect and the privacy protecting effect may be getting worse due to the compensation of the voltage while the ratio of the brightness in the first and the second regions R1 and R2 can be maintained in around 5.

TABLE 5

| The ratio of the brightness in the first region R1 and the brightness in the second region R2 | | The second driving voltage (or the third driving voltage) | | | | |
|---|---|---|---|---|---|---|
| | | 0 V | 2.1 V | 2.175 V | 2.2 V | 2.3 V |
| The side viewing angle | 5° | 1.377 | 1.343 | 1.306 | 1.290 | 1.222 |
| | 45° | 87.346 | 8.392 | 4.974 | 4.306 | 2.719 |

In light of the foregoing, the LCD panel according to the invention improves the problem of giddy feeling of the user when the user watches the image displayed by the LCD panel under the narrow viewing angle display mode in the normal viewing angle direction by configuring the compensation display area or modulating the brightness of the display areas and the LCD panel according to the invention also provides desirable privacy protecting effect.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An LCD panel divided into at least one first region and at least one second region, the first region and the second region respectively having a plurality of sub-pixels arranged in an array, and each of the sub-pixels having:
    a first display area providing a first main alignment vector;
    a second display area providing a second main alignment vector, and a direction of the first main alignment vector being opposite to a direction of the second main alignment vector;
    a first compensation display area, a cell gap of the first compensation display area being substantially greater than a cell gap of the first display area, the first compensation display being connected with the first display area, and the first compensation display area and the first display area being simultaneously enabled or disabled; and
    a second compensation display area, a cell gap of the second compensation display area being substantially greater than a cell gap of the second display area, the second compensation display being connected with the second display area, and the second compensation display area and the second display area being simultaneously enabled or disabled,
    wherein driving voltages of the first display areas and the first compensation display areas in the first region are substantially greater than driving voltages of the second display areas and the second compensation display areas in the first region, and driving voltages of the first display areas and the first compensation display areas in the second region are substantially smaller than driving voltages of the second display areas and the second compensation display areas in the second region.

2. The LCD panel of claim 1, wherein an area of the first compensation display area is not greater than an area of the first display area and an area of the second compensation display area is not greater than an area of the second display area.

3. The LCD panel of claim 1, wherein each of the sub-pixel comprises a first pixel electrode and a second pixel electrode, the first pixel electrode defines the first display area and the first compensation display area, and the second pixel electrode defines the second display area and the second compensation display area.

4. The LCD panel of claim 3, wherein the first pixel electrode has a first alignment area, a second alignment area, a third alignment area, and a fourth alignment area, the first alignment area and the second alignment area construct the first display area, the third alignment area and the fourth alignment area construct the first compensation display area, a vector sum of a first alignment vector of the first alignment area, a second alignment vector of the second alignment area, a third alignment vector of the third alignment area, and a fourth alignment vector of the fourth alignment area constructs the first main alignment vector, and a vector sum of the third alignment vector and the fourth alignment vector is substantially parallel to the second main alignment vector.

5. The LCD panel of claim 4, wherein an included angle between the third alignment vector and the second main alignment vector and an included angle between the fourth alignment vector and the second main alignment vector are greater than or equal to about 45 degrees and smaller than about 90 degrees.

6. The LCD panel of claim 3, wherein the second pixel electrode has a fifth alignment area, a sixth alignment area, a seventh alignment area, and an eighth alignment area, the fifth alignment area and the sixth alignment area construct the second display area, the seventh alignment area and the eighth alignment area construct the second compensation display area, a vector sum of a fifth alignment vector of the fifth alignment area, a sixth alignment vector of the sixth alignment area, a seventh alignment vector of the seventh alignment area, and an eighth alignment vector of the eighth alignment area constructs the second main alignment vector, and a vector sum of the seventh alignment vector and the eighth alignment vector is substantially parallel to the first main alignment vector.

7. The LCD panel of claim 6, wherein an included angle between the seventh alignment vector and the first main alignment vector and an included angle between the eighth alignment vector and the first main alignment vector are greater than or equal to about 45 degrees and smaller than about 90 degrees.

8. The LCD panel of claim 1, wherein cell gaps of the first compensation display area and the second compensation display area are substantially 7 μm and cell gaps of the first display area and the second display area are substantially 3.5 μm.

9. An LCD panel comprising at least one first region and at least one second region, wherein the first region and the second region respectively have a plurality of sub-pixels arranged in an array, and each of the sub-pixels comprising:
    a first display area divided into a plurality of first alignment areas by a first horizontal baseline and a first vertical baseline, the first alignment areas respectively having a liquid crystal alignment, and the liquid crystal alignments of the first alignment areas are different from one another; and
    a second display area divided into a plurality of second alignment areas by a second horizontal baseline and a second vertical baseline, the second alignment areas respectively having a liquid crystal alignment, and the liquid crystal alignments of the second alignment areas are variant,
    wherein a first driving voltage of the first display areas in the first region is substantially greater than a second driving voltage of the first display areas in the second region, and the second driving voltage is substantially greater than 0 when the LCD panel displays a first normal viewing brightness under a narrow viewing angle display mode.

10. The LCD panel of claim 9, wherein the first driving voltage of the first display areas in the first region is substantially greater that a third driving voltage of the second display areas in the first region, and the first driving voltage of the first display areas in the first region is substantially equal to a fourth driving voltage of the second display areas in the second region when the LCD panel displays the first normal viewing brightness under the narrow viewing angle display mode.

11. The LCD panel of claim 9, wherein the second driving voltage of the second display areas located in the first region is about 2.175V when displaying the first normal viewing brightness.

12. The LCD panel of claim 9, wherein the first horizontal baseline divides the first display area evenly such that the liquid crystal alignments of the first display area are symmetrically distributed with respect to the first horizontal baseline while the first vertical baseline divides the first display area unevenly into a first sub-display area and a second sub-display area having an area different from an area of the first sub-display area; and the second horizontal baseline divides the second display area evenly such that the liquid crystal alignments of the second display area are symmetrically distributed with respect to the second horizontal baseline while the second vertical baseline divides the second display area unevenly into a third sub-display area and a fourth sub-display area having an area different from an area of the third sub-display area.

13. The LCD panel of claim 12, wherein an area of the first sub-display area is substantially greater than an area of the second sub-display area and an area of the third sub-display area is substantially greater than an area of the fourth sub-display area.

14. The LCD panel of claim 13, wherein a cell gap of the first sub-display area is substantially smaller than a cell gap of the second sub-display area and a cell gap of the third sub-display area is substantially smaller than a cell gap of the fourth sub-display area.

\* \* \* \* \*